United States Patent [19]

Tzikas

[11] Patent Number: 5,003,052

[45] Date of Patent: Mar. 26, 1991

[54] REACTIVE DYES CONTAINING A SUBSTITUTED AMINOCARBONYL REACTIVE MOIETY

[75] Inventor: Athanassios Tzikas, Pratteln, Switzerland

[73] Assignee: Ciba-Geigy Corporation, Ardsley, N.Y.

[21] Appl. No.: 191,846

[22] Filed: May 11, 1988

Related U.S. Application Data

[63] Continuation of Ser. No. 884,769, Jul. 11, 1986, abandoned.

[30] Foreign Application Priority Data

Jul. 12, 1985 [CH] Switzerland .................. 3035/85

[51] Int. Cl.$^5$ .................. C09B 62/503; C09B 62/51; D06P 1/384; D06P 3/66
[52] U.S. Cl. .................. 534/641; 534/617; 534/618; 534/619; 534/620; 534/621; 534/622; 534/623; 534/624; 534/625; 534/626; 534/627; 534/628; 534/629; 534/630; 534/631; 534/632; 534/633; 534/634; 534/635; 534/636; 534/637; 534/638; 534/639; 534/640; 534/642; 534/643
[58] Field of Search .................. 534/617-643

[56] References Cited

U.S. PATENT DOCUMENTS

| | | | |
|---|---|---|---|
| 3,128,267 | 4/1964 | Schmetz et al. | 534/643 X |
| 3,503,953 | 3/1970 | Loffelman | 534/643 X |
| 4,248,773 | 2/1981 | Hurter et al. | 534/643 X |
| 4,602,084 | 7/1986 | Hurter | 534/643 X |

FOREIGN PATENT DOCUMENTS

| | | | |
|---|---|---|---|
| 172789 | 2/1986 | European Pat. Off. | 534/642 |
| 881536 | 11/1961 | United Kingdom | 534/643 |
| 1155149 | 6/1969 | United Kingdom | 534/641 |
| 1354906 | 5/1974 | United Kingdom | 534/641 |
| 1576237 | 10/1985 | United Kingdom | 534/635 |

*Primary Examiner*—Floyd D. Higel
*Attorney, Agent, or Firm*—Wenderoth, Lind & Ponack

[57] ABSTRACT

A reactive dye of the formula

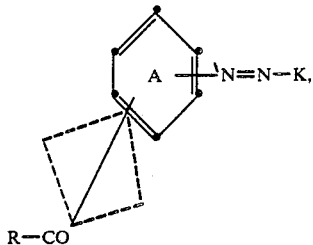

in which R is a radical of the formula

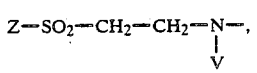

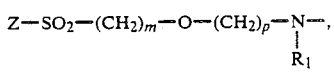

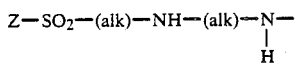

or 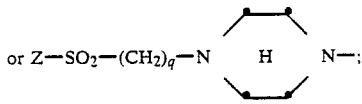

or

Z is $\beta$-sulfatoethyl, $\beta$-thiosulfatoethyl, $\beta$-phosphatoethyl, $\beta$-acetoxyethyl, $\beta$-halogenoethyl or vinyl; V is hydrogen or a radical
$Z-SO_2-CH_2-CH_2-$
in which z is as defined above; $R_1$ is hydrogen or $C_{1-6}$-alkyl; alk, independently of each other, are polymethylene radicals having 2 to 6 C atoms or their branched isomers; K is a benzene, naphthalene or heterocyclic radical; m is 1 to 6, p is 1 to 6 and q is 1 to 6; and the benzene or naphthalene radical A is further unsubstituted or substituted by $C_1-C_4$-alkyl, $C_1-C_4$-alkoxy, $C_1-C_8$-acylamino, $C_1-C_4$-alkylamino, phenylamino, N,N-di-$\beta$-hydroxyethylamino, N,N-di-$\beta$-sulfatoethylamino, sulfobenzylamino, N,N-disulfobenzylamino, $C_1-C_4$-alkoxycarbonyl, $C_1-C_4$-alkylsulfonyl, trifluoromethyl, nitro, cyano, halogen, carbamoyl, N-$C_1-C_4$-alkylcarbamoyl, sulfamoyl, N-$C_1-C_4$-alkylsulfamoyl, N-($\beta$-hydroxyethyl)-sulfamoyl, N,N-di-($\beta$-hydroxyethyl)-sulfamoyl, N-phenylsulfamoyl, ureido, hydroxyl, carboxyl, sulfomethyl, sulfo or amino.

9 Claims, No Drawings

REACTIVE DYES CONTAINING A SUBSTITUTED AMINOCARBONYL REACTIVE MOIETY

This application is a continuation application of now abandoned application Ser. No. 884,769, filed Jul. 11, 1986.

The present invention relates to novel reactive dyes, to a process for their preparation and to their use for dyeing or printing fiber materials.

The practice of dyeing with reactive dyes has recently led to increased demands on the quality of the dyeings and the economics of the dyeing process. There consequently continues to be a demand for new reactive dyes which have improved properties, in particular application properties.

The present demand in the dyeing of cotton by the cold pad-batch method is for reactive dyes which have adequate substantivity at the low dyeing temperature and which also have good wash-off properties with respect to the unfixed portions. They should also have a high reactivity, so that only short batching times are necessary, and they should in particular produce dyeings having high degrees of fixation. These demands are met only inadequately by known dyes.

The present invention therefore has for its object to find new, improved reactive dyes for the cold pad-batch method which have the qualities characterized above to a high degree. The new dyes should be distinguished in particular by high degrees of fixation and high fiber-dye bond stabilities, and moreover the portions not fixed on the fiber should be easy to wash off. They should furthermore produce dyeings having good allround fastness properties, for example light and wet fastness properties.

It has been found that this object is achieved with the novel reactive dyes defined hereinafter.

The invention accordingly provides reactive dyes of the formula

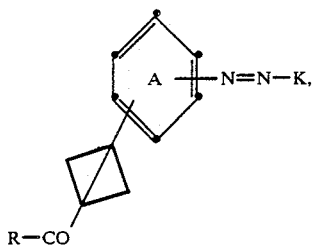 (1)

in which R is a radical of the formula

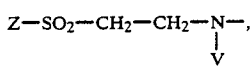 (1a)

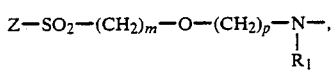 (1b)

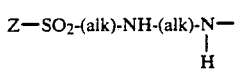 (1c)

or

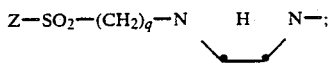 (1d)

Z is β-sulfatoethyl, β-thiosulfatoethyl, β-phosphatoethyl, β-acetoxyethyl, β-halogenoethyl or vinyl; V is hydrogen or a radical

in which Z is as defined above; $R_1$ is hydrogen or $C_{1-6}$-alkyl; alk, independently of each other, are polymethylene radicals having 2 to 6 C atoms or their branched isomers; K is the radical of a coupling component of the benzene or naphthalene series or of the heterocyclic series; m is 1 to 6, p is 1 to 6 and q is 1 to 6; and the benzene or naphthalene radical A can contain further substituents.

A β-halogenoethyl Z is in particular the β-chloroethyl radical. The polymethylene radicals alk are preferably ethylene, propylene or butylene.

The radical $R_1$ is for example methyl, ethyl, propyl, isopropyl, butyl, isobutyl, sec.-butyl, tert.-butyl, pentyl or hexyl, or preferably hydrogen. The indices m, p and q are independent of one another and preferably 2, 3 or 4. Possible further substituents on the benzene or naphthalene radical A are the same as mentioned below in the explanation of the radical K.

The radical K can itself in turn contain azo groups; it can thus be the radical of an azo compound, in particular of a monoazo compound. As the radical of a coupling component of the benzene or naphthalene series, K is thus preferably a benzene, naphthalene, azobenzene, naphthylazobenzene, azonaphthalene or phenylazonaphthalene radical which, as indicated below, can be further substituted. As the radical of a coupling component of the heterocyclic series, K can be a pyrazolone or pyridone radical or the radical of one of the heterocyclic coupling components mentioned hereinafter. In this case too the radical K can contain further azo groups, for example when K is present as phenylazopyrazolone radical.

The radical K in the formula (1) can contain bonded to its basic structure the substituents customary in azo chemistry.

Examples of further substituents in the radical K which may be mentioned are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, hydroxyl, carboxyl, sulfomethyl or sulfo. Preferably the radical K contains one or more sulfonic acid groups. Suitable further substituents on the radical K are, in particular, methyl, ethyl, methoxy, ethoxy, acetylamino, benzoylamino, amino, chlorine, bromine, ureido, hydroxyl, carboxyl, sulfomethyl or sulfo.

Preferred reactive dyes of the formula (1) are monoazo and disazo dyes.

Also suitable are reactive dyes of the formula (1) in which the radical K additionally includes a further reactive radical. Thus trireactive dyes are also included.

The additional reactive radicals included in K can be bonded to K via amino groups or in some other way, for example by a direct bond. The above explanations apply analogously also to disazo dyes.

Preference is given to: reactive dyes of the formula

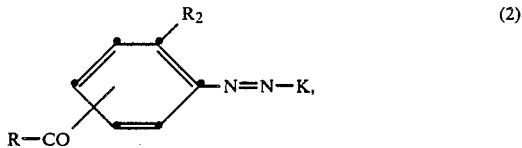

in which $R_2$ is hydrogen, $C_{1-4}$-alkyl, $C_{1-4}$-alkoxy, halogen, hydroxyl, carboxyl or sulfo; and R and K are as defined under the formula (1);

reactive dyes of the formula

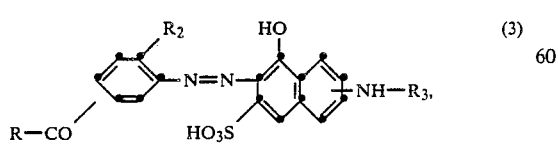

in which $R_3$ is hydrogen, $C_{1-4}$-alkyl or $C_{1-4}$-alkanoyl, and R and $R_2$ are as defined under the formula (2);

reactive dyes of the formula (3), in which $R_3$ is acetyl;

reactive dyes of the formula

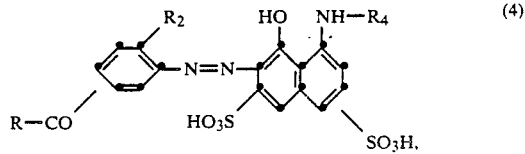

in which $R_4$ is hydrogen, $C_{1-4}$-alkanoyl or benzoyl, and R and $R_2$ are as defined in the formula (2);

reactive dyes of the formula (4), in which $R_4$ is benzoyl;

reactive dyes of the formula

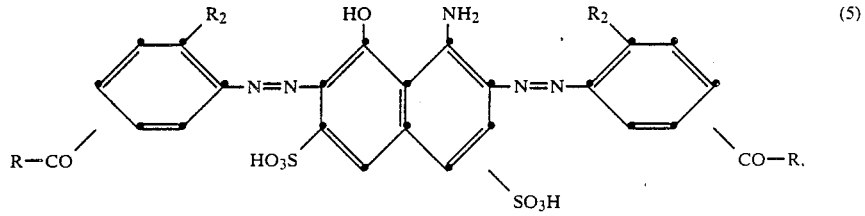

in which R and $R_2$ are as defined under the formula (2);

reactive dyes of the formula

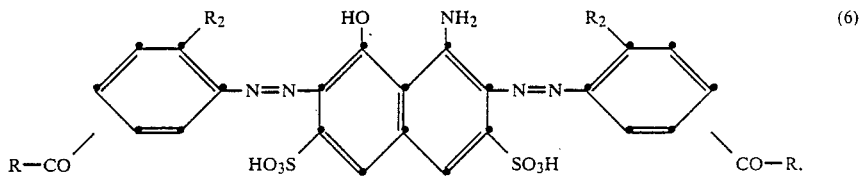

in which R and $R_2$ are as defined under the formula (2);

reactive dyes of the formula

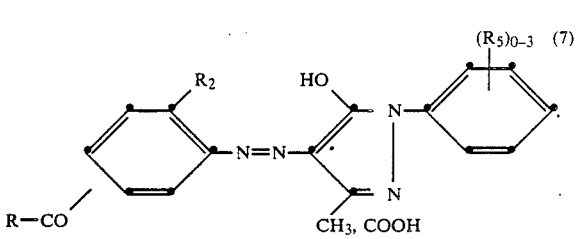

in which $R_5$ is 0 to 3 mutually independent substituents from the group chlorine, methyl, methoxy, carboxyl or sulfo, and R and $R_2$ are as defined under the formula (2);

reactive dyes of the formula

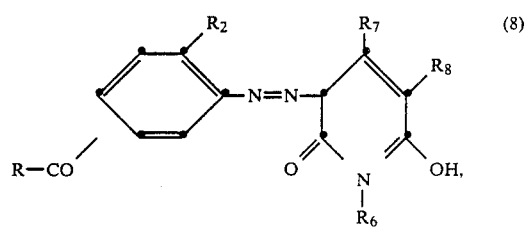

in which $R_6$ and $R_7$ are independently of each other hydrogen, $C_{1-4}$-alkyl or phenyl, and $R_8$ is hydrogen, cyano, carbamoyl or sulfomethyl, and R and $R_2$ are as defined under the formula (2);

Heavy metal complexes of reactive dyes of the formulae (1) to (8); suitable complexing heavy metals are in particular copper, nickel, cobalt and chromium.

Preference is given in particular to compounds of the formulae (1) to (8) in which Z is the β-sulfatoethyl-, β-chloroethyl- or vinyl group.

The process for preparing reactive dyes of the formula (1) comprises reacting diazo components of the formula

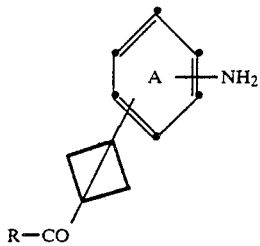 (9)

or their precursors, and coupling components of the formula

H-K (10)

by diazotization and coupling to give reactive dyes of the formula (1), or converting the intermediates obtained into the desired end dyes, and if desired following up with a further conversion reaction.

If desired, a precursor is used in place of a coupling component of the formula (10) and the end dye is completed by a further coupling or further couplings or other conversion reactions with the intermediate.

If the reactive dyes prepared contain groups capable of metal complex formation, the reactive dyes can also be subsequently metallized.

The most important process variants are described in the examples.

In what follows, possible starting materials which can be used for preparing the reactive dyes of the formula (1) will be named individually.

Diazocomponents of the formula (9)

1-β-(β'-chloroethylsulfonyl)-ethylcarbamoyl-3-aminobenzene,
1-β-(β'-chloroethylsulfonyl)-ethylcarbamoyl-4-chloro-3-aminobenzene,
1-β-(β'-chloroethylsulfonyl)-ethylcarbamoyl-4-methyl-3-aminobenzene,
1-β-(β'-chloroethylsulfonyl)-ethylcarbamoyl-4-methoxy-3-aminobenzene,
1-β-[β'-(βΔ-chloroethylsulfonyl)-ethyloxy]-ethylcarbamoyl-3-aminobenzene,
1-bis-[β-(β'-chloroethylsulfonyl)-ethyl]-carbamoyl-3-aminobenzene,
1-β-(β'-chloroethylsulfonyl)-ethylcarbamoyl-4-aminobenzene,
1-β-[β'-(β'''-chloroethylsulfonyl)-ethyloxy]-ethylcarbamoyl-4aminobenzene,
1-bis-[β-(β'-chloroethylsulfonyl)-ethyl]-carbamoyl-4-aminobenzene,
1-β(vinylsulfonyl)-ethylcarbamoyl-4-aminobenzene,
1-bis-[β-(vinylsulfonyl)-ethyl]-carbamoyl-4-aminobenzene,
1-bis-[β-(β'-chloroethylsulfonyl)-ethyl]-carbamoyl-4-chloro-3-aminobenzene,
1-bis-[β-(β'-chloroethylsulfonyl)-ethyl]-carbamoyl-4-methyl-3-aminobenzene,
1-β-[β'-(β''-chloroethylsulfonyl)-ethyloxy]-ethylcarbamoyl-3-aminobenzene,
1-β-(β'-chloroethylsulfonyl)-ethylcarbamoyl-4-hydroxy-3-aminobenzene,
1-bis-[β-(β'-chloroethylsulfonyl)-ethyl]-carbamoyl-4-hydroxy-3-amino-benzene,
1-bis-[β-(β'-chloroethylsulfonyl)-ethyl]-carbamoyl-4-methoxy-3-aminobenzene, and corresponding compounds in which the β-chloroethylsulfonyl group is replaced by β-sulfatoethylsulfonyl or vinylsulfonyl; are also suitable are:

1-β-(β'-chloroethylsulfonyl)-ethylcarbamoyl-4-amino-3-sulfobenzene,
1-β-(β'-sulfatoethylsulfonyl)-ethylcarbamoyl-4-amino-3-sulfobenzene,
1-β-vinylsulfonyl-ethylcarbamoyl-4-amino-3-sulfobenzene,
1-β-vinylsulfonyl-ethylcarbamoyl-3-amino-2-sulfobenzene,
1-β-(β'-sulfatoethylsulfonyl)-ethylcarbamoyl-3-amino-4-methoxybenzene,
1-bis-(β-vinylsulfonylethyl)-carbamoyl-4-amino-3-sulfobenzene,
1-bis-[β-(β'-sulfatoethylsulfonyl)-ethyl]-carbamoyl-3-amino-4-methoxybenzene,
1-bis-(β-vinylsulfonylethyl)-carbamoyl-3-amino-2-sulfobenzene,
1-(3-amino-4-methoxybenzoyl)-N'-(γ-vinylsulfonylpropyl)piperazine,
1-bis(β-vinylsulfonylethyl)carbamoyl-4-amino-3-methoxybenzene,
1-β-(β'-vinylsulfonyl)-ethylamino)-ethylcarbamoyl-3-aminobenzene,
1-(3-amino-4-methylbenzoyl)-N'-(β-vinylsulfonylethyl)-piperazine,
1-bis-[β-(β'-sulfatoethylsulfonyl)-ethyl]-carbamoyl-4-amino-3-sulfobenzene,
1-bis-(β-vinylsulfonylethyl)carbamoyl-3-amino-4-methoxybenzene,
1-(β-vinylsulfonylethyl)-carbamoyl-3-amino-4-methoxybenzene,
1-(4-amino-3-sulfobenzoyl)-N'-(γ-vinylsulfonylpropyl)-piperazine,
1-β-(β'-vinylsulfonylethylamino)-ethylcarbamoyl-4-amino-3-sulfobenzene,
1-β-(β'-sulfatoethylsulfonyl)-ethylcarbamoyl-3-amino-4-methylbenzene,
1-bis-[β-(β'-chloroethylsulfonyl)-ethyl]-carbamoyl-4-amino-3-sulfobenzene,
1-(4-amino-3-sulfobenzoyl)-N'-(β-vinylsulfonylethyl)-piperazine,
1-β-(β'-vinylsulfonylethylamino)-ethylcarbamoyl-4-amino-3-sulfobenzene,
5-amino-1,3-bis(β-vinylsulfonylethylcarbamoyl)-benzene,
1-β-(β'-vinylsulfonylethyloxy)-ethylcarbamoyl-4-amino-3-sulfobenzene.

Further diazo components

Aminobenzene, 1-amino-2-, -3- or 4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulfonamide, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6-, or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 4-aminobenzene-3,4'-disulfonic acid, 3-methoxy-4-amino-6-methylazobenzene-2',4'-disulfonic acid or 3-methoxy-4-amino-6-methylazobenzene-2',5'-disulfonic acid.

Coupling components

Phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hdroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxy-naphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-di-sulfonic acid, 1-(3'-aminobenzylamino)-8-hydroxynaphthalene-3,6-or -4,6-disulfonic acid, 1-(3'-nitrobenzylamino)-8-hydroxynaphthalene-3,6- or -4,6-disulfonic acid, 2-(4'-amino-3'-sulfophenylamino)-5-hydroxynaphthalene-7-sulfonic acid, 3-methylpyrazol-5-one, 1-phenyl-3-methyl-5-pyrazolone, 1-(4'-sulfophenyl)-3-methyl-5-pyrazolone, 1-(4'-sulfophenyl)-pyrazol-5-one-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphth-2'-yl)-3-methyl-5-pyrazolone, 1-(5',7'-disulfonaphth-2-yl)-3-methyl-5-pyrazolone, 1-(2',5'-dichloro-4'-sulfophenyl)-3-methyl-5-pyrazolone, 3-aminocarbonyl-4-methyl-6-hydroxypyrid-2-one, 1-ethyl-3-cyano- or -3-chloro-4-methyl-6-hydroxypyrid-2-one, 1-ethyl-3-3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)-naphthalene-3,6-disulfonic acid, 1-amino-8-hydroxy-2-(4'-sulfophenylazonaphthalene-3,6-disulfonic acid, 1-amino-8-hydroxy-2-(2',5'-disulfophenylazo)-naphthalene-3,6-disulfonic acid, 1-$\beta$-aminoethyl-3-cyano-4-methyl-6-hydroxypyrid-2-one, 1-$\gamma$-aminopropyl-3-sulfomethyl-4-methyl-6-hydroxypyrid-2-one, 1,3-diaminobenzene, 1-amino-3-N,N-di-$\beta$-hydroxyethylaminobenzene, 1-amino-3-N,N-di-$\beta$-sulfatoethylaminobenzene, 1-amino-3-N,N-di-$\beta$-hydroxyethylamino-4-methoxybenzene, 1-amino-3-N,N-di-$\beta$-sulfatoethylamino-4-methoxybenzene, 1-amino-3-sulfobenzylaminobenzene, 1-amino-3-sulfobenzylamino-4-chlorobenzene, 1-amino-3-N,N-disulfobenzylaminobenzene.

The diazotization of the diazo components or of the intermediates containing a diazotizable amino group is as a rule effected by the action of nitrous acid in aqueous mineral acid solution at low temperatures. The coupling onto the coupling component is effected at strongly acid, neutral or weakly alkaline pH values.

Another advantageous method comprises first preparing a dye which contains a precursor of the reactive radical and subsequently to convert this precursor into the end stage, for example by esterification or an addition reaction. For example, it is possible to prepare a dye of the formula (1) in which Z is an HO—CH—CH$_2$CH$_2$— radical and to react the intermediate before or after the acylation with sulfuric acid, so that the hydroxyl group is converted into the sulfato group; or to use an analagous dye in which Z is the vinyl group H$_2$C=CH—, and to add thiosulfuric acid onto the intermediate, giving an HO$_3$SS—CH$_2$—CH$_2$— radical.

The sulfation of the hydroxyl group in a dye of the formula (1) or a suitable precursor is preferably effected by reaction with concentrated sulfuric acid at 0° C. to moderately elevated temperature. The sulfaction can also be effected by reacting the hydroxy compound with 2 equivalents of chlorosulfonic acid per hydroxyl group in a polar organic solvent such as N-methylpyrrolidone at 10° to 80° C. Preferably the sulfation is effected by adding the compound in question to sulfuric acid monohydrate at temperatures between 5° and 15° C.

The introduction of another radical for Z into a compound of the formula (1) or an intermediate in place of a halogen atom or the sulfato group, for example a thiosulfato or phosphato group, is effected in a manner known per se.

In addition the synthesis can be followed by elimination reactions. For example, it is possible to treat reactive dyes of the formula (1) which contain sulfatoethylsulfonyl radicals with agents which split off hydrogen halide, such as sodium hydroxide, to convert the sulfatoethylsulfonyl radicals into vinylsulfonyl radicals.

The invention further provides the compounds used as diazo components and having the formula

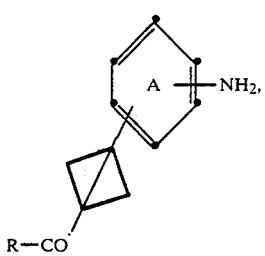 (9)

in which R and A are as defined under the formula (1).

The compounds of the formula (9) can be prepared by condensing the corresponding aminobenzoyl or aminonaphthoyl chlorides with amines which conform to the radicals of the formula (1a) to (1d); or by starting from a nitrobenzoyl or nitronaphthoyl chloride, condensing with the amine and reducing the nitro group to an amino group. According to another method described in German Offenlegungsschrift 2,040,620, the acid chloride can be reacted with an unsaturated aliphatic amine and 2-mercaptoethanol can be added onto the double bond of the acid amide at temperatures between 50° C. and 180° C. using catalytic amounts of a free radical producer or of sulfur. The resulting hydroxyethyl thioether compounds can also be prepared by condensing the acid chloride with a halogenoalkylamine and heating the condensation product with 2-mercaptoethanol and sodium alcoholate in alcohol. The thioether compounds are then additionally oxidized to the corresponding sulfones.

The oxidation of the thioether compounds to the sulfones can be effected by various methods, for example with hydrogen peroxide with or without the presence of tungsten or vanadium compounds as catalysts, and also with peracetic acid, potassium permanganate or chromic acid, or with chlorine/hydrochloric acid in each case in an aqueous, aqueous-organic or organic medium.

The carboxamides thus obtainable, in which the grouping —SO₂—Z is a β-hydroxyethylsulfonyl group, can be converted by treatment with sulfating agents, phosphorylating agents, halogenating agents, alkyl- or aryl-sulfonic acid halides, alkyl- or aryl-carboxylic acid halides, alkyl- or aryl-carboxylic anhydrides into the corresponding dye precursors in which the —SO₂—Z grouping is the —SO₂—CH₂—CH₂—O—SO₃H, —SO₂—CH₂—CH₂—O—PO₃H₂, —SO₂—CH₂—CH₂—halogen or —SO₂—CH₂—O—acyl grouping. The products thus obtained can in turn be converted by treatment with alkalizing agents, for example alkali metal hydroxide or alkali metal carbonate, such as sodium hydroxide or sodium carbonate, into corresponding compounds in which the —SO₂—Z grouping is a —SO₂—CH=CH₂ grouping. The products thus obtained can in turn be converted by reaction (addition) with salts of thiosulfuric acid, such as sodium sulfate, with dialkylamines, such as dimethylamine or diethylamine, or with phenol into compounds in which the —SO₂—Z grouping is the —SO₂—CH₂—CH₂—S—SO₃H, —SO₂—CH₂—CH₂—N(alkyl)₂ or

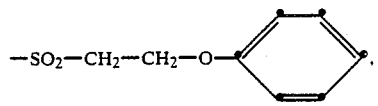

grouping.

Suitable sulfating agents are herein for example concentrated sulfuric acid and also chlorosulfonic acid and amidosulfonic acid or other compounds which give off sulfur trioxide. Suitable phosphorylating agents are herein for example concentrated phosphoric acid, pyrophosphoric, metaphosphoric or polyphosphoric acid, alkyl polyphosphates, phosphorus oxychloride or mixtures of phosphoric acid and phosphorus(V) oxide. Suitable halogenating agents are for example thionyl chloride or thionyl bromide.

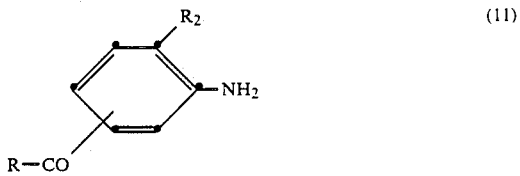 (11)

in which R is a radical of the formula

 (11a)

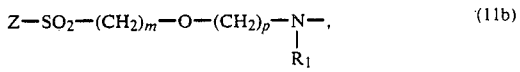 (11b)

 (11c)

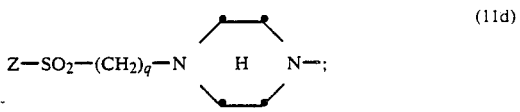 (11d)

Z, V, R₁, alk, m, p and q are as defined under the formula (1); and R₂ is hydrogen, C₁₋₄-alkyl, C₁₋₄-alkoxy, halogen, hydroxyl, carboxyl or sulfo.

The preferred process for preparing the compounds of the formula (11) comprises condensing a nitrobenzoyl chloride of the formula

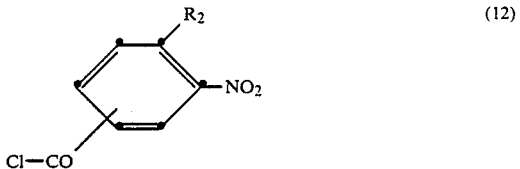 (12)

with an amine of the formula

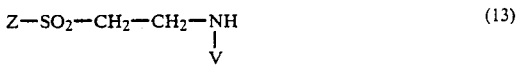 (13)

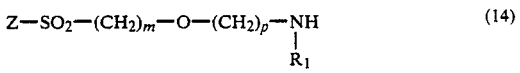 (14)

-continued

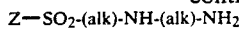
(15)

or

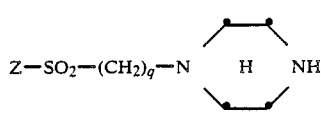
(16)

and reducing the nitro group to an amino group.

The reaction is preferably carried out in a high-boiling organic solvent, for example nitrobenzene. The reduction of the nitro group to the amino group is effected in a manner known per se by catalytic hydrogenation with Pd/carbon in ethanol, ethyl acetate or tetrahydrofuran at room temperature up to about 40° C. The reduction can also be carried out with Fe/hydrochloric acid in aqueous solution.

In a modification of the process described above, compounds of the formula (11) can also be prepared by condensing a nitrobenzoyl chloride of the formula (12) with an amine of the formula

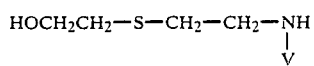
(13a)

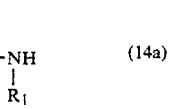
(14a)

-continued

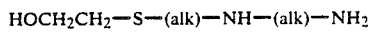
(15a)

or

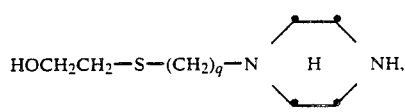
(16a)

oxidizing the condensation product with elemental chlorine to the corresponding β-chloroethylsulfonyl compound and reducing the nitro group to the amino group.

The condensation of the nitrobenzoyl chloride with the amines of the formulae (13a) to (16a) is carried out for example in chloroform at room temperature and in the presence of alkaline, acid-binding agents, for example alkali metal hydroxides, carbonates or bicarbonates. The condensation product is subsequently oxidized in a manner known per se with a chlorine/hydrochloric acid mixture. The reduction of the nitro group to the amino group is effected as described above.

The amines of the formulae (13) to (16a) used as starting compounds can be prepared analogously to the process of Example 1 of German Offenlegungsschrift 2,614,550.

In addition to the above-described reactive dyes of the formulae (2) to (8), further valuable representatives are the reactive dyes of the following formulae:

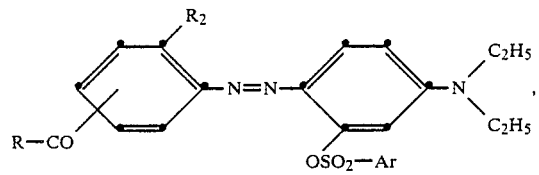
(17)

Ar: aryl, e.g. phenyl.

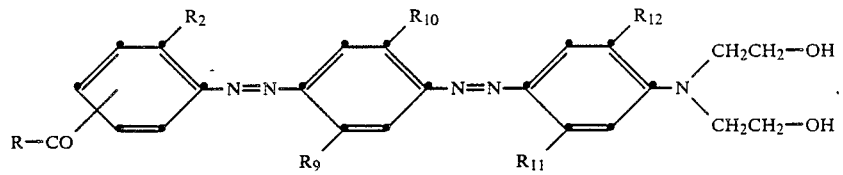
(18)

$R_9$ to $R_{12}$: H, $C_{1-4}$-alkyl, $C_{1-4}$-alkoxy, halogen, acetylamino, ureido.

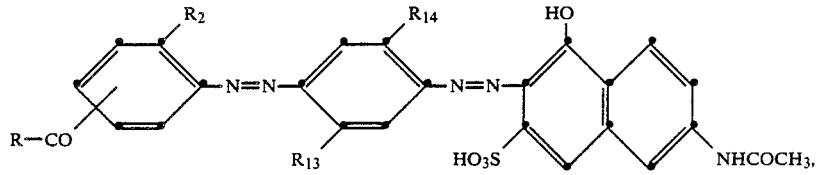
(19)

$R_{13}$, $R_{14}$: H, $C_{1-4}$-alkyl, $C_{1-4}$-alkoxy, halogen, acetylamino, ureido

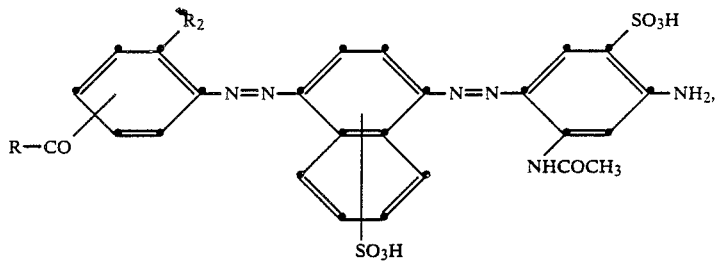
(20)

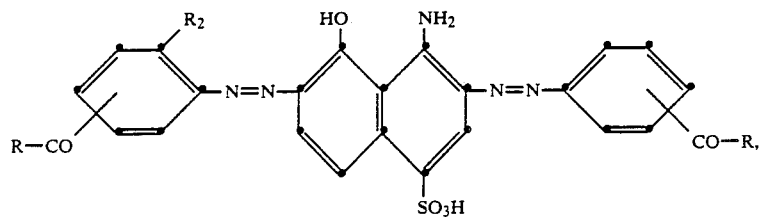
(21)
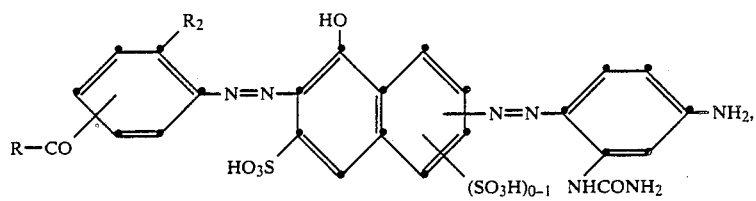
(22)
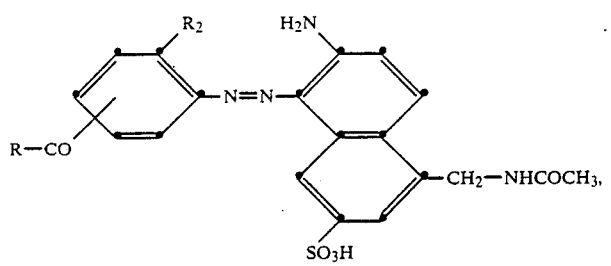
(23)
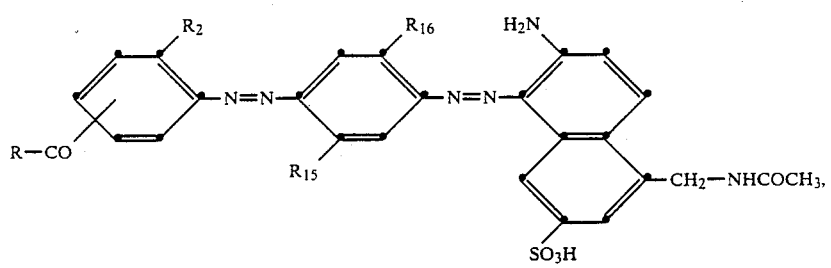
(24)
$R_{15}$, $R_{16}$: H, $C_{1-4}$-alkyl, $C_{1-4}$-alkoxy, halogen, acetylamino, ureido
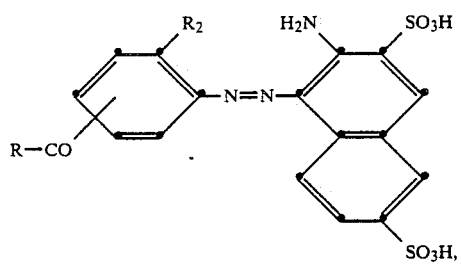
(25)
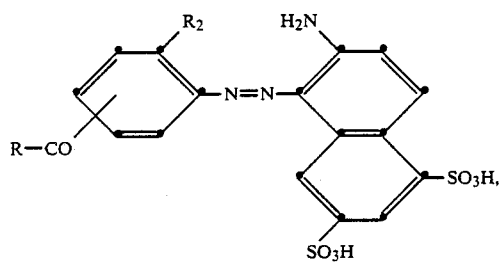
(26)

-continued
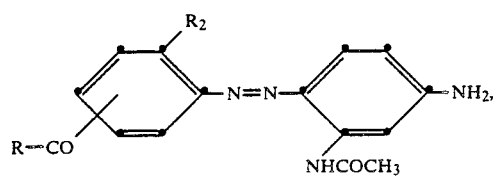
(27)
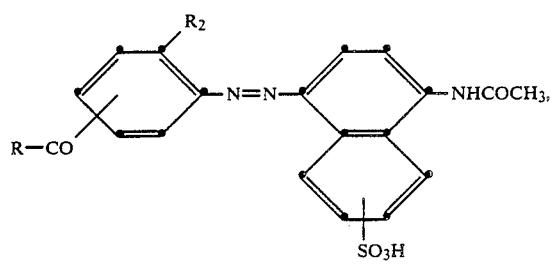
(28)
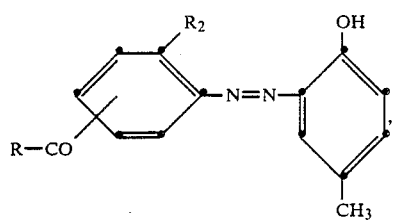
(29)
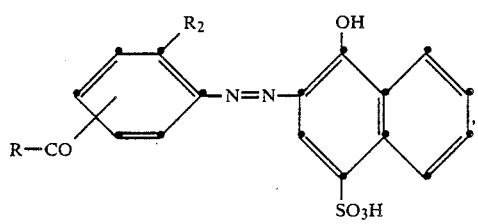
(30)
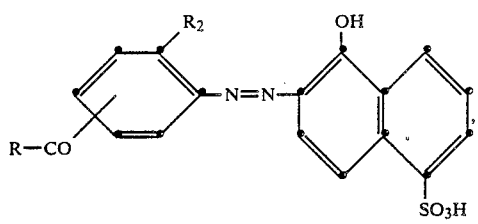
(31)
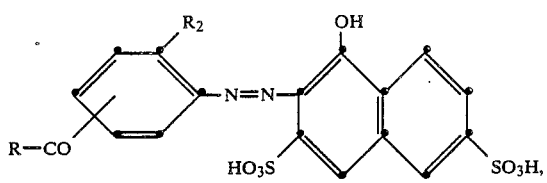
(32)
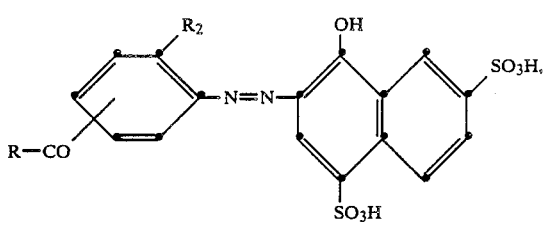
(33)

-continued
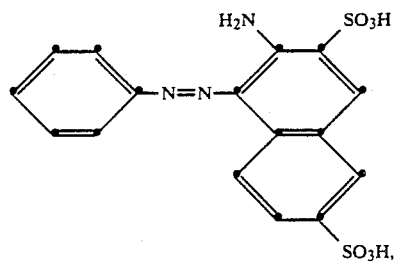 (34)
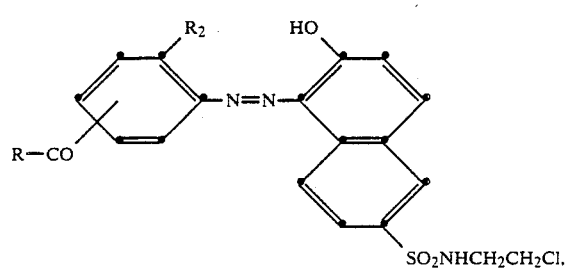 (35)
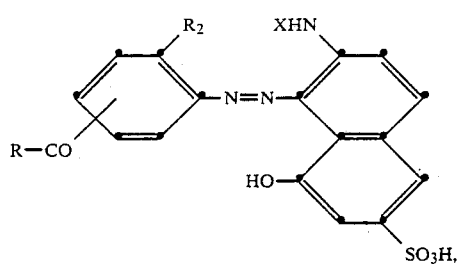 (36)
X: H, COCH₃.
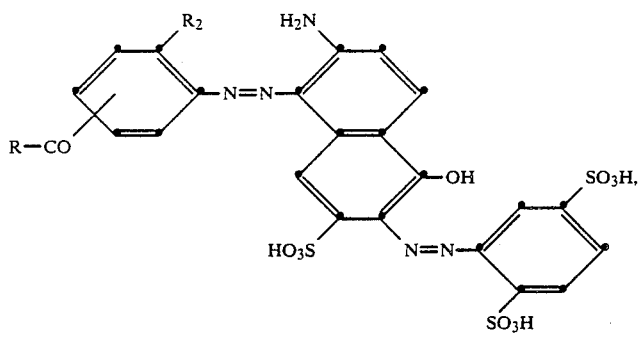 (37)
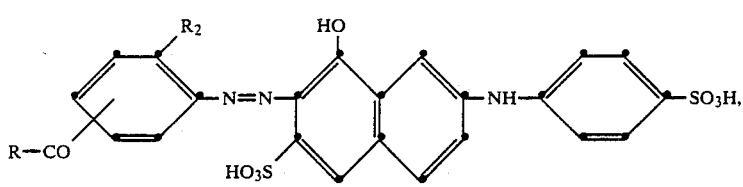 (38)
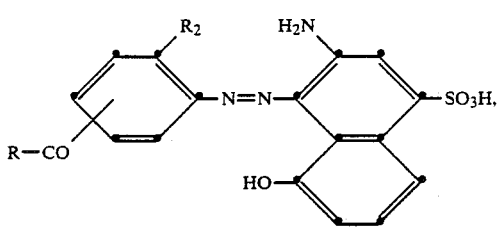 (39)

-continued
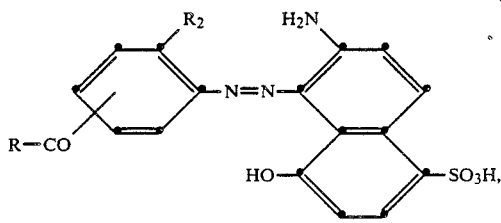 (40)
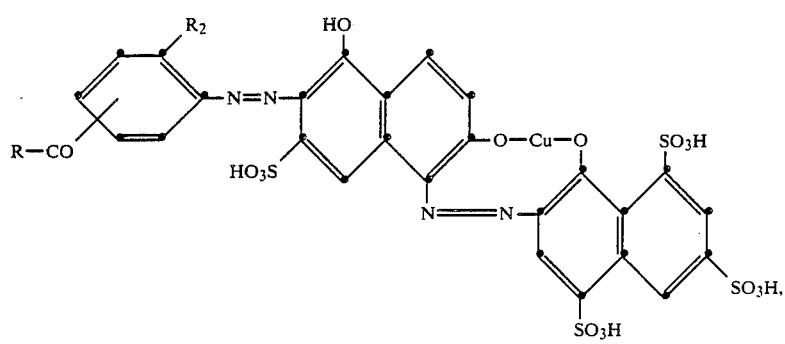 (41)
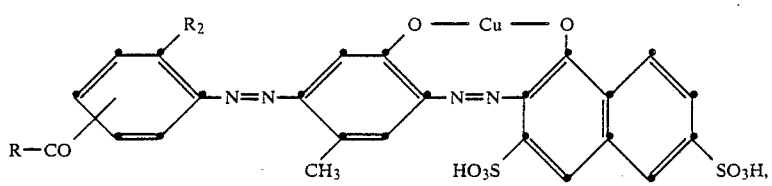 (42)
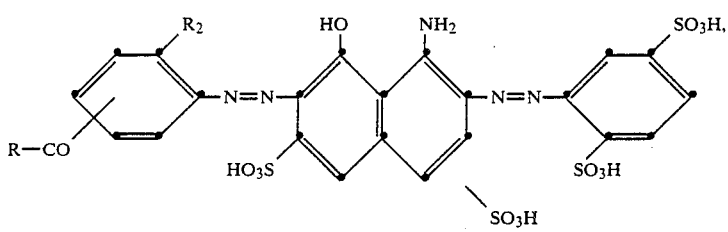 (43)
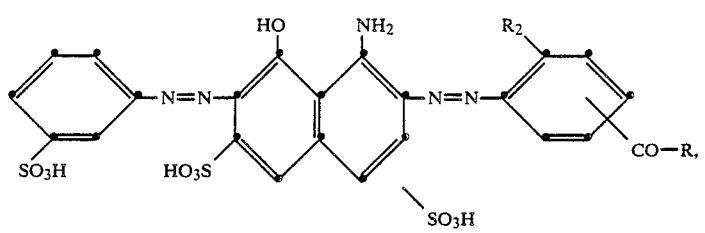 (44)
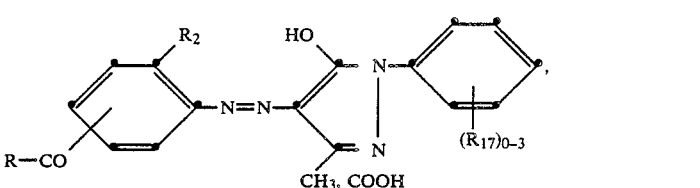 (45)
$R_{17}$: $C_{1-4}$-alkyl, $C_{1-4}$-alkoxy, halogen, carboxyl, sulfo.
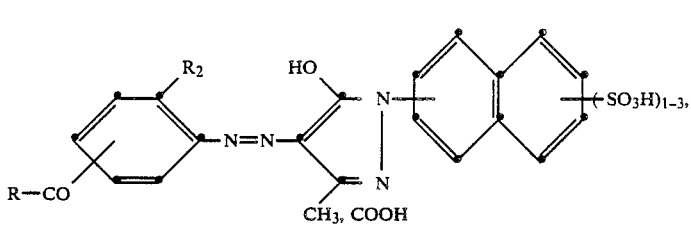 (46)

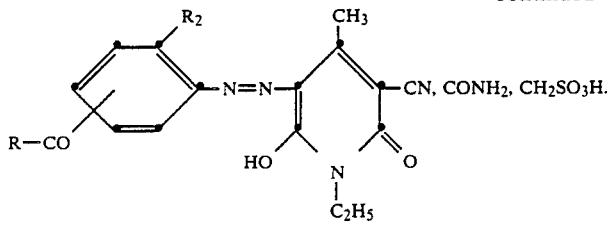

(47)

In the formulae (17) to (47) the radicals $R_9, R_{10}, \ldots$ etc., which belong to one and the same formula, are independent of one another, and R and $R_2$ are as defined under the formulae (1) and (2). Preferably the radicals $R_9$ to $R_{16}$ are hydrogen, methyl, ethyl, methoxy, ethoxy, acetylamino, ureido or chlorine. The radical $R_{17}$ is preferably methyl, methoxy, chlorine or sulfo.

The dyes of the formula (1) are fiber-reactive. Fiber-reactive compounds are to be understood as meaning those which are capable of reaction with the hydroxyl groups of cellulose or with the amino groups of natural or synthetic polyamides to form covalent chemical bonds.

The reactive dyes of the formula (1) are suitable for dyeing and printing a very wide variety of materials, such as silk, leather, wool, polyamide fibers and polyurethanes, and in particular cellulose-containing fiber materials of any kind. These fiber materials are for example the natural cellulose fiber, such as cotton, linen and hemp, and also wood pulp and regenerated cellulose. The reactive dyes of the formula (1) are also suitable for dyeing or printing hydroxyl-containing fibers which are contained in blend fabrics, for example blends of cotton with polyester fibers or polyamide fibers.

The dyes according to the invention can be applied to the fiber material and be fixed on the fiber in various ways, in particular in the form of aqueous dye solutions and print pastes. They are suitable not only for the exhaust method of dyeing but also for dyeing by the pad dye method, whereby the cloth is impregnated with aqueous dye solutions which can, if desired, also contain salt, and the dyes are fixed after an alkali treatment or in the presence of alkali, if desired, with heating. They are particularly suitable for the so-called cold pad-batch method, whereby the dye is applied together with the alkali on a pad-mangle and is then fixed by storing at room temperature for several hours. After fixing, the dyeings or prints are thoroughly rinsed with cold and hot water, if desired in the presence of an agent which acts like a dispersant and promotes the diffusion of the unfixed portions.

The reactive dyes of the formula (1) are distinguished by high reactivity and good fixing properties. They can therefore be used in the exhaust dyeing method at low dyeing temperatures and only require short steaming times in the pad-steam method. The degrees of fixation are high, and the unfixed portions can be readily washed off, the difference between the degree of exhaustion and the degree of fixation being remarkably small, i.e. the hydrolysis loss being very low. The reactive dyes of the formula (1) are also particularly suitable for printing, especially on cotton, but also for printing nitrogen-containing fibers, for example wool, silk or wool-containing blend fabrics.

The dyeings and prints on cellulose fiber materials prepared with the dyes according to the invention have a high tinctorial strength and a high fiber-dye bond stability not only in the acid but also in the alkaline range, as well as a good light fastness and very good wet fastness properties, such as wash, water, seawater, cross-dyeing and perspiration fastness properties, and a good pleating fastness, hot press fastness and crock fastness.

The following examples serve to illustrate the invention. The temperatures are given in degrees celsius, and parts and percentages are by weight unless otherwise stated. Parts by weight relate to parts by volume as the kilogram relates to the liter.

The preparation of the monoazo or disazo intermediate compounds has not been described in all cases in the examples which follow, but it is immediately evident from the general description.

EXAMPLE 1

33 parts of 1-$\beta$-($\beta'$-chloroethylsulfonyl)-ethylcarbamoyl-4-aminobenzene hydrochloride are added with stirring to 300 parts of water. After addition of 36 parts of 31% strength hydrochloric acid the lot is cooled down to 5°. At that temperature 20 parts by volume of an aqueous 5N sodium nitrite solution are gradually added dropwise, which is followed by about 1 hour of stirring. Excess nitrous acid is destroyed with a little amidosulfonic acid.

To obtain coupling, 22.3 parts of the sodium salt of N-phenyltaurine, dissolved in 150 parts of water, are added; the pH value is set to about 5.5 by gradual addition of sodium bicarbonate. After the coupling has ended, the azo compound formed is precipitated by means of potassium chloride (in an amount of 25% by volume of the volume of the solution), is filtered off with suction and is dried at 60° under reduced pressure. This leaves an orange-red salt-containing powder which gives a yellow-orange solution in water and contains the compound of the formula

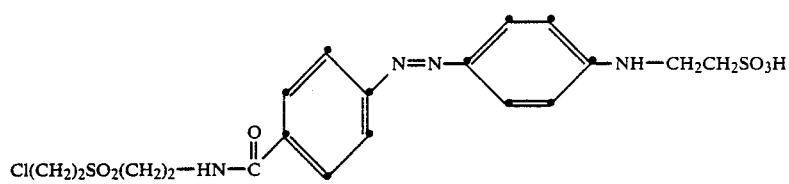

as an alkali metal salt, predominantly as potassium salt. It is highly suitable for dyeing (including printing) cotton by the application and fixing methods customary for fiber-reactive dyes and produces yellowish orange dyeings and prints having good light and wet fastness properties.

EXAMPLE 2

Example 1 is repeated, except that the N-phenyltaurine coupling component is replaced by the equivalent amount of N-(γ-sulfopropyl)-aniline or N-(γ-sulfo-β-hydroxypropyl)-aniline, affording in this way the corresponding alkali metal salts of the azo compounds of the formulae

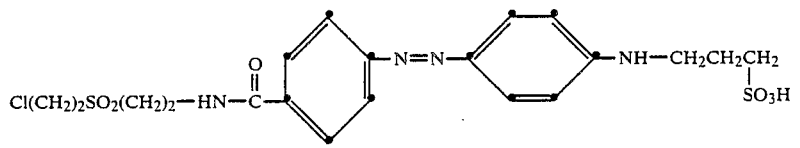

or

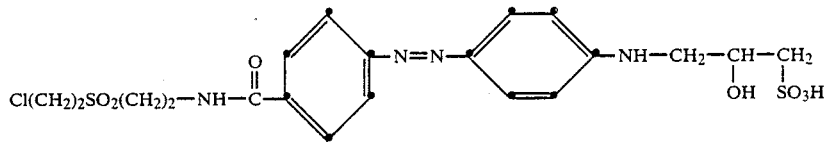

having a shade comparable to the azo compound, according to the invention, of Example 1 and likewise good coloristic properties.

EXAMPLE 3

33 parts of 3-amino-1-β-(β'-chloroethylsulfonyl)-ethylcarbamoylbenzene hydrochloride are diazotized by the method described in Example 1. After excess nitrous acid has been destroyed, a cooled solution of 27.15 parts of N-β-sulfoethyl-2-methyl-5-chloroaniline in the form of the sodium salt in 150 parts of water is added, and the coupling is carried out initially in the strongly acid range and later, by addition of sodium bicarbonate, at a pH value between 5.5 and 6.0. After the coupling has ended, the azo compound is precipitated by adding potassium chloride, is isolated by a filtration and is dried at 60° under reduced pressure.

This leaves an orange powder which, in addition to electrolyte, predominantly contains the potassium salt of the azo compound of the formula

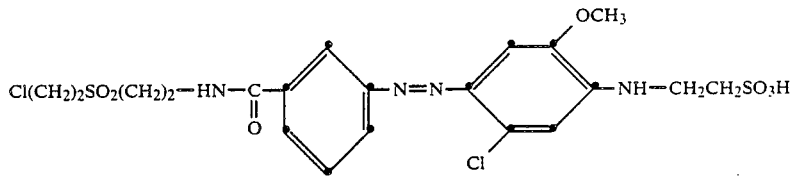

It is highly suitable or use as a dye and produces by the application and fixing methods customary and known for fiber-reactive dyes bright golden orange dyeings and prints on cotton and wool which have very good light and wet fastness properties.

EXAMPLE 4

Example 2 is repeated, except that the coupling component used there is replaced by the equivalent amount of N-(γ-sulfo-β-hydroxypropyl)-2-methyl-5-chloroaniline or N-(γ-sulfopropyl)-2-methyl-5-chloroaniline, affording in this way the corresponding alkali metal salts of the azo compounds of the formulae

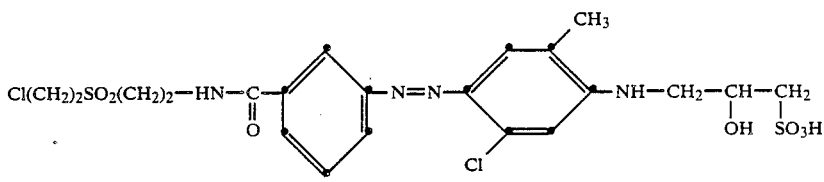

or

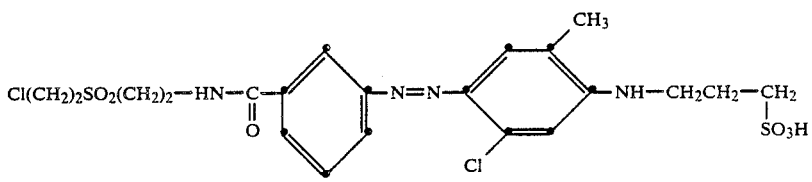

having a shade very similar to the azo compound according to the invention of Example 2 and equally good coloristic properties.

EXAMPLE 5

The diazotization and coupling method described in Example 1 is followed, except that the coupling component specified there is replaced by 28.75 parts of the sodium salt of N-β-(sulfoethyl)-2-methoxy-5-chloroaniline. Precipitation of the azo compound thus prepared by means of potassium chloride from the coupling batch gives an orange-red powder which, in addition to electrolyte, predominantly contains the potassium salt of the compound of the formula

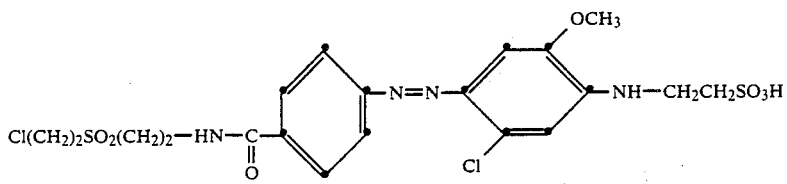

The compound is very highly suitable for use as a dye and gives on cotton and wool orange dyeings having a good light fastness and very good stability to wash treatments.

EXAMPLE 6

Example 5 is repeated using the equivalent amount of the sodium salt of N-(γ-sulfo-β-hydroxypropyl)-2-methoxy-5-chloro-aniline in place of the coupling component mentioned there, affording a corresponding dye according to the invention having a very similar shade and likewise very good coloristic properties.

EXAMPLE 7

The diazotization and coupling method of Example 2 is followed, except that the coupling component used there is replaced by 31.6 parts of the sodium salt of N-β-sulfoethyl-N-ethyl-2-methoxy-5-chloroaniline. The azo compound thus prepared is isolated from the coupling solution either by adding sodium chloride or by spray-drying.

This gives a red powder which, in addition to the electrolyte, contains the sodium salt of the azo compound of the formula is highly suitable for use as a dye and gives on cotton and wool yellowish red dyeings which have very good fastness properties.

EXAMPLE 8

33 parts of 4-amino-1-β-(β'-chloroethylsulfonyl)-ethylcarbamoylbenzene hydrochloride are diazotized as described in Example 1, and the diazo suspension is gradually added to a cooled solution of 28.75 parts of the sodium salt of N-β-sulfoethyl-2-chloro-5-methoxyaniline in 200 parts of water, while the pH value of the coupling solution is maintained between 5 and 6.5 by adding sodium bicarbonate. After the coupling has ended, the resulting azo compound is isolated by spray-drying. This gives an orange-red powder which, in addition to electrolyte, contains the sodium salt of the compound of the formula

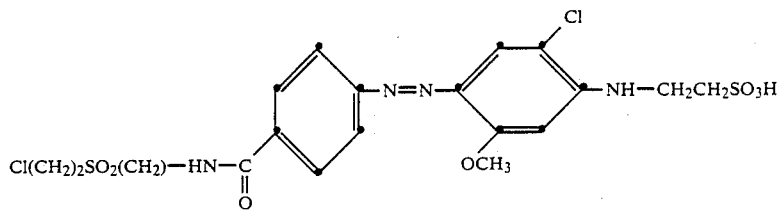

This compound y suitable for use as a reactive dye for dyeing and printing cotton and wool and produces bright golden orange dyeings and prints which have a good light fastness and very good wet fastness properties.

EXAMPLE 9

33 parts of 3-amino-1-β-(β'-chloroethylsulfonyl)ethylcarbamoylbenzene hydrochloride are diazotized as described in Example 2.

To obtain coupling, 38.75 parts of the disodium salt of N,N-bis-(β-sulfoethyl)-3-chloroaniline, dissolved in 200 parts of water, are added, and the pH value of the coupling solution is adjusted to about 5.5 to 6.0 by gradually adding sodium bicarbonate. After the coupling has ended, the resulting azo compound is isolated by spray-drying. This gives an orange-colored powder which, in addition to electrolyte, contains the sodium salt of the compound of the formula

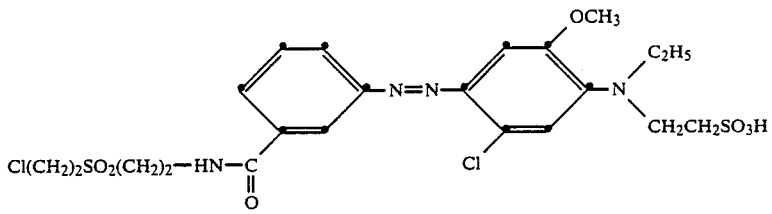

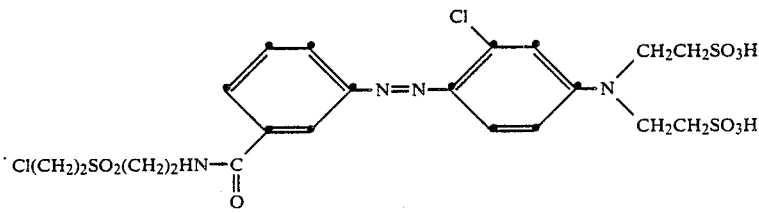

This sodium salt is very highly suitable for use as a reactive dye for dyeing (including printing) cotton and wool and produces bright golden yellow dyeings and prints having good light fastness and very good wet fastness properties.

EXAMPLE 10

35.5 parts of 4-methoxy-3-amino-1-$\beta$-($\beta'$-chloroethylsulfonyl)-ethylcarbamoylbenzene hydrochloride are dissolved in 150 parts of water by adding 11.5 parts of sodium bicarbonate. 20 parts by volume of an aqueous 5N sodium nitrite solution are then added. After cooling down to 0° to 5°, this mixture is poured into a mixture of 100 parts of ice and 36 parts by volume of 31% hydrochloric acid. The diazonium compound formed is hereby partially precipitated. The mixture is subsequently stirred at 0° to 5° for about a further hour, and excess nitrous acid is then destroyed with a little amidosulfonic acid.

For the coupling reaction, this diazo suspension is added in small portions to a cold solution of 26.5 parts of the sodium salt of N-$\beta$-sulfoethyl-N-ethyl-3-methylaniline in 200 parts of water and the pH value is maintained between 4 and 5 by sprinkling in sodium acetate.

The azo compound formed is isolated from the coupling solution either by adding sodium chloride or by spray-drying. This gives a dark red powder which, in addition to the electrolyte, contains the sodium salt of the compound of the formula

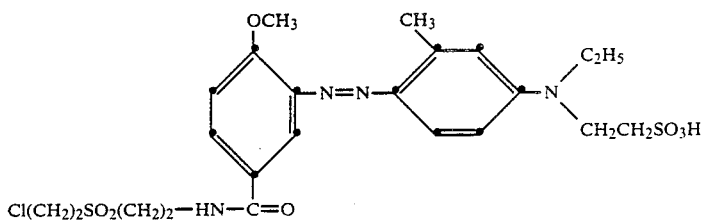

This compound is very highly suitable for use as a dye and, applied by the application and fixing methods customary and known for fiber-reactive dyes, produces on cotton and wool yellowish red dyeings and prints having good fastness properties.

EXAMPLE 11

Replacing the coupling component used in Example 10 by 29.5 parts of the sodium salt of N-($\gamma$-sulfo-$\beta$-hydroxypropyl)-N-ethyl-3-methylaniline gives the sodium salt of the compound of the formula

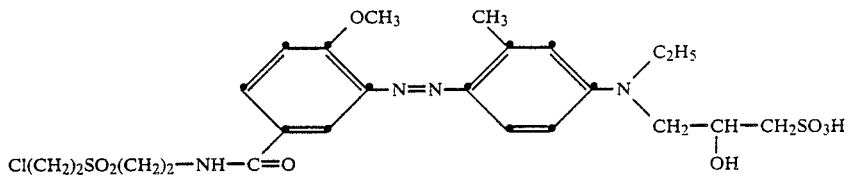

which is a dye having equally good properties and virtually the same hue as the dye of Example 10.

EXAMPLE 12

The diazotization and coupling method of Example 10 is followed, except that the coupling component specified there is replaced by 38.1 parts of the sodium salt of N-($\gamma$-sulfo-$\beta$-acetoxypropyl)-N-$\beta$-acetoxyethylaniline. Separating off the azo compound thus prepared by spray-drying gives a red powder which, in addition to electrolyte, contains the sodium salt of the compound of the formula

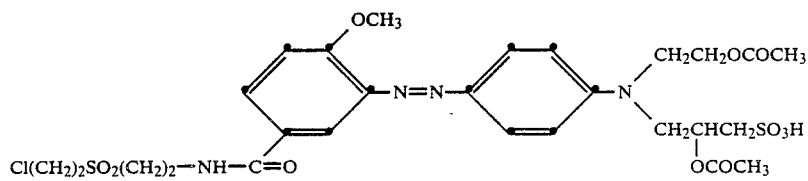

This compound uses by the dyeing methods customary for fiber-reactive dyes yellowish red dyeings and prints on cotton and wool, which have good all-round fastness properties.

EXAMPLE 13

The diazotization and coupling method of Example 10 is followed, except that the coupling component specified there is replaced by 25.1 parts of the sodium salt of N-ethyl-N-sulfoethylaniline. Separating off the azo compound thus prepared from the coupling branch by means of potassium chloride, and drying gives a red powder which, in addition to electrolyte, predominantly contains the potassium salt of the compound of the formula

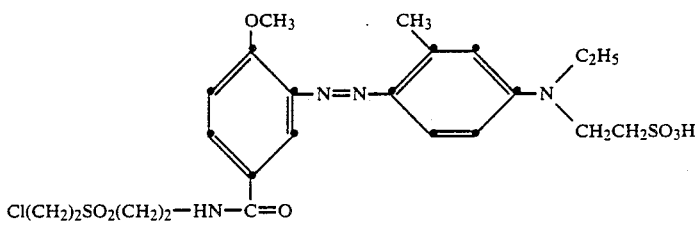

This powder, applied by the application and fixing methods customary for reactive dyes, produces on cotton and wool bright yellowish red dyeings and prints having good light fastness and very good resistance to wash treatments.

EXAMPLE 14

The diazotization and coupling method of Example 10 is followed, except that the coupling component used there is replaced by 36.7 parts of the disodium salt of N,N-bis-($\beta$-sulfoethyl)-3-methylaniline. Isolating the azo compound thus prepared by spray-drying gives a red powder which, in addition to electrolyte, contains the sodium salt of the compound of the formula

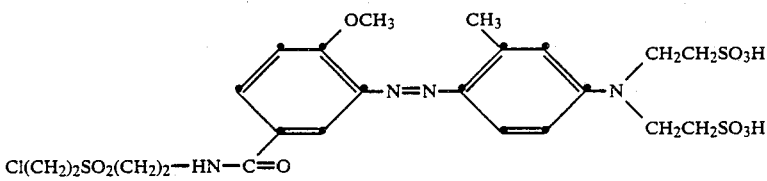

This powder produces by the dyeing methods customary for reactive dyes yellowish red dyeings and prints on cotton and wool having very good resistance to wash treatments.

EXAMPLE 15

34 parts of 4-methyl-3-amino-1-$\beta$-($\beta'$-chloroethylsulfonyl)-ethylcarbamoylbenzene hydrochloride are dissolved in 150 parts of water by adding 11.5 parts of sodium bicarbonate. 20 parts by volume of an aqueous 5N sodium nitrite solution are then added. After cooling down to 0° to 5° this mixture is poured into a mixture of 100 parts of ice and 36 parts by volume of 31% hydrochloric acid. The resulting diazonium compound partially precipitates. The mixture is subsequently stirred at 0° to 5° for about a further hour, and excess nitrous acid is then destroyed with a little amidosulfonic acid.

For the coupling reaction, this diazo suspension is added in small portions to a cold solution of 26.5 parts of the sodium salt of N-$\beta$-sulfoethyl-N-ethylaniline in 200 parts of water, and the pH value is maintained between 4 and 5 by sprinkling in sodium acetate.

The azo compound formed is isolated from the coupling solution either by adding sodium chloride or by spray-drying. This gives a dark red powder which, in addition to electrolyte, contains the sodium salt of the compound of the formula

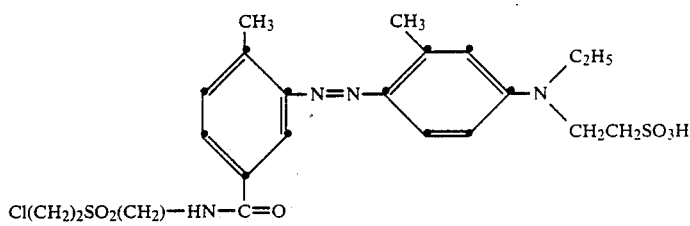

This compound is very highly suitable for use as a dye and, applied by the application and fixing methods customary and known for fiber-reactive dyes, produces on cotton and wool yellowish red dyeings and prints having good fastness properties.

EXAMPLE 16

45 parts of 3-amino-1-bis-$\beta$-($\beta'$-chloroethylsulfonyl)-ethylcarbamoylbenzene hydrochloride are diazotized as described in Example 2.

To obtain coupling, 38.75 parts of the disodium salt of N,N-bis-($\beta$-sulfoethyl)-3-chloroaniline, dissolved in 200 parts of water, are added, and the pH value of the coupling solution is adjusted to about 5.5 to 6.0 by gradually adding sodium bicarbonate. After the coupling has ended, the azo compound formed is isolated by spray-drying. This gives an orange-colored powder which, in addition to electrolyte, contains the sodium salt of the compound of the formula

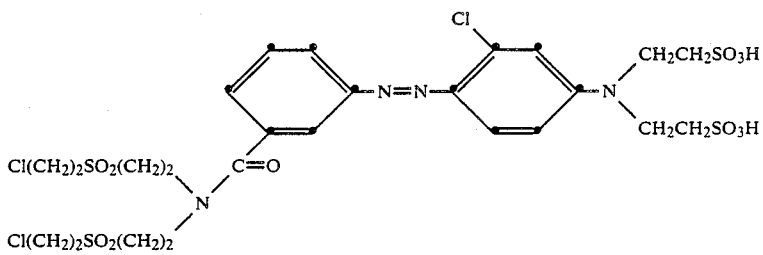

This powder is very highly suitable for use as a reactive dye for dyeing (including printing) cotton and wool and gives bright golden orange dyeings and prints having good light fastness and very good wet fastness properties.

EXAMPLE 17

33 parts of 4-amino-1-β-(β'-chloroethylsulfonyl)-ethylcarbamoylbenzene hydrochloride are diazotized as described in Example 2.

To obtain coupling, 38.75 parts of the disodium salt of N,N-bis-(β-sulfoethyl)-3-chloroaniline, dissolved in 200 parts of water, are added, and the pH value of the coupling solution is adjusted to about 5.5 to 6.0 by gradually adding sodium bicarbonate. After the coupling has ended, the azo compound formed is isolated by spray-drying. This gives an orange-colored powder which, in addition to electrolyte, contains the sodium salt of the compound of the formula

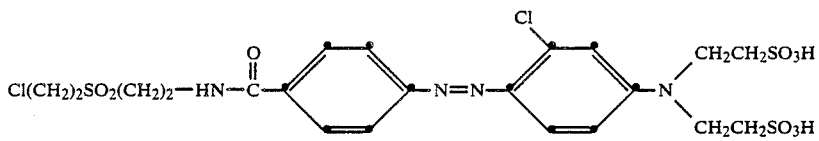

This powder is very highly suitable for use as a reactive dye for dyeing (including printing) cotton and wool and gives bright golden 6range dyeings and prints having good light fastness and very good wet fastness properties.

EXAMPLE 18

35 parts of 4-chloro-3-amino-1-β-(β'-chloroethylsulfonyl)-ethylcarbamoylbenzene hydrochloride are dissolved in 150 parts water by adding 11.5 parts of sodium bicarbonate. 20 parts by volume of an aqueous 5N sodium nitrite solution are then added. After cooling down to 0° to 5° this mixture is poured into a mixture of 100 parts of ice and 36 parts by volume of 31% hydrochloric acid. The resulting diazonium compound partially precipitates. The mixture is subsequently stirred at 0° to 5° for about a further hour, and excess nitrous acid is destroyed with a little amidosulfonic acid.

For the coupling reaction, this diazo suspension is added in small portions to a cold solution of 26.5 parts of the sodium salt of N-β-sulfoethyl-N-ethyl-3-methylaniline in 200 parts of water and the pH value is maintained between 4 and 5 by sprinkling in sodium acetate.

The azo compound formed is isolated from the coupling solution either by adding sodium chloride or by spray-drying. This gives a dark red powder which, in addition to electrolyte, contains the sodium salt of the compound of the formula

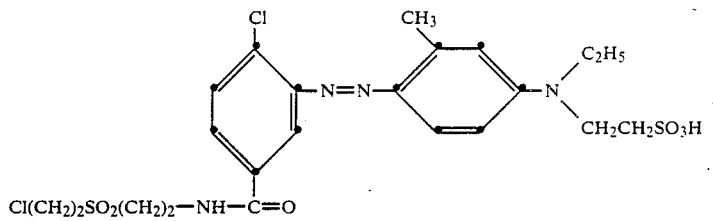

This compound is very highly suitable for use as a dye and, applied by the application and fixing methods customary and known for fiber-reactive dyes, produces on cotton and wool strong yellowish red dyeings and prints having good fastness properties.

EXAMPLES 19 TO 82

The azo compounds according to the invention of the general formula (1) characterized in the tabulated examples below in terms of their diazo components and coupling components can likewise be prepared in a manner according to the invention, for example by the methods of the above examples.

These fiber-reactive azo compounds according to the invention have very good dye properties combined with very good application properties and produce dyeings and prints on the fiber materials mentioned in the description, in particular on cellulose fiber materials and wool, by the application and fixing methods customary for fiber-reactive dyes, having good to very good fastness properties in the indicated hues on cotton.

The diazo components $D_1$ to $D_{13}$ mentioned in the examples are listed individually immediately after the table.

TABLE 1

| Example | Diazo component | Coupling component | Hue on cotton |
|---|---|---|---|
| 19 | $D_2$ | N-(2-chloroprop-1-en-3-yl)-N-($\beta$-sulfoethyl)-aniline | Yellowish orange |
| 20 | $D_2$ | 3-methyl-N-ethyl-N-($\beta$-sulfoethyl)-aniline | Orange |
| 21 | $D_3$ | N-methyl-N-($\beta$-sulfoethyl)-aniline | Orange |
| 22 | $D_6$ | 3-chloro-N-($\beta$-acetoxyethyl)-N-($\beta$-sulfoethyl)-aniline | Orange |
| 23 | $D_6$ | N-($\beta$-sulfoethyl)-aniline | Orange |
| 24 | $D_{13}$ | N-($\beta$-sulfoethyl)-aniline | Orange |
| 25 | $D_1$ | N-methyl-N-($\beta$-sulfoethyl)-aniline | Orange |
| 26 | $D_9$ | N-($\beta$-hydroxyethyl)-N-($\beta$-sulfoethyl)-aniline | Reddish orange |
| 27 | $D_4$ | N-($\beta$-sulfoethyl)-aniline | Orange |
| 28 | $D_5$ | 2-methoxy-5-chloro-N-($\beta$-sulfoethyl)-aniline | Yellowish red |
| 29 | $D_7$ | N-(2-bromoprop-1-en-3-yl)-N-($\beta$-sulfoethyl)-aniline | Yellowish red |
| 30 | $D_8$ | 3-chloro-N-ethyl-N-($\beta$-sulfoethyl)-aniline | Red |
| 31 | $D_{12}$ | 2,5-dichloro-N-($\gamma$-sulfo-$\beta$-hydroxypropyl)-aniline | Bright golden yellow |
| 32 | $D_{13}$ | 2-chloro-3-methyl-N-($\gamma$-sulfo-$\beta$-hydroxypropyl)-aniline | Bright yellowish orange |
| 33 | $D_1$ | N-ethyl-N-($\gamma$-sulfo-$\beta$-hydroxypropyl)-aniline | Orange |
| 34 | $D_1$ | 2-methoxy-5-chloro-N-ethyl-N-($\gamma$-sulfo-$\beta$-hydroxypropyl)-aniline | Yellowish red |
| 35 | $D_1$ | N-($\beta$-sulfo-$\alpha$-methylethyl)-aniline | Yellowish orange |
| 36 | $D_9$ | N-ethyl-N-($\gamma$-sulfo-$\beta$-hydroxypropyl)-aniline | Orange |
| 37 | $D_5$ | 3-chloro-N-($\beta$-chloroethyl)-N-($\gamma$-sulfo-$\beta$-chloropropyl)-aniline | Orange |
| 38 | $D_5$ | 3-methyl-N-($\beta$-hydroxy-$\beta$-phenylethyl)-N-($\gamma$-sulfo-$\beta$-chloropropyl)-aniline | Reddish orange |
| 39 | $D_{12}$ | 3-methyl-N-ethyl-N-($\gamma$-sulfo-$\beta$-acetoxypropyl)-aniline | Yellowish red |
| 40 | $D_{13}$ | 2-methoxy-5-chloro-N-($\beta$-hydroxyethyl)-N-($\gamma$-sulfo-$\beta$-hydroxypropyl)-aniline | Red |
| 41 | $D_2$ | N-($\beta$-sulfo-$\alpha$-methylethyl)-aniline | Yellowish orange |
| 42 | $D_5$ | 3-chloro-N-($\beta$-sulfoethyl)-aniline | Golden orange |
| 43 | $D_6$ | 2,5-dichloro-N-($\beta$-sulfoethyl)-aniline | Golden yellow |
| 44 | $D_4$ | 2-methyl-N-($\beta$-sulfoethyl)-aniline | Golden orange |
| 45 | $D_1$ | 2,6-dimethyl-N-($\beta$-sulfoethyl)-aniline | Yellowish orange |
| 46 | $D_2$ | 2,3-dichloro-N-($\beta$-sulfoethyl)-aniline | Yellowish orange |
| 47 | $D_3$ | 2-chloro-5-methyl-N-($\beta$-sulfoethyl)-aniline | Golden yellow |
| 48 | $D_{13}$ | 3-methoxy-N-($\beta$-sulfoethyl)-aniline | Yellowish brown |
| 49 | $D_9$ | N-ethyl-N-($\beta$-sulfoethyl)-aniline | Yellowish orange |
| 50 | $D_5$ | 2-methoxy-5-chloro-N-($\beta$-hydroxyethyl)-N-($\beta$-sulfoethyl)-aniline | Yellowish red |
| 51 | $D_1$ | 2-methoxy-N-($\beta$-sulfoethyl)-aniline | Orange |
| 52 | $D_7$ | N-butyl-N-($\beta$-sulfoethyl)-aniline | Yellowish orange |
| 53 | $D_8$ | 2,5-dichloro-N-($\beta$-sulfoethyl)-aniline | Yellowish orange |
| 54 | $D_{13}$ | 3-methyl-N-benzyl-N-($\beta$-sulfoethyl)-aniline | Yellowish red |
| 55 | $D_{12}$ | 3-methyl-N-($\beta$-hydroxyethyl)-N-($\beta$-sulfoethyl)-aniline | Yellowish red |
| 56 | $D_9$ | N-($\beta$-hydroxy-$\beta$-phenylethyl)-N-($\beta$-sulfoethyl)-aniline | Yellowish red |
| 57 | $D_1$ | 2,5-dichloro-N-($\beta$-sulfoethyl)-aniline | Yellowish red |
| 58 | $D_5$ | 2-methyl-5-chloro-N-($\beta$-sulfoethyl)-aniline | Orange |
| 59 | $D_5$ | 2,3-dichloro-N-($\beta$-sulfoethyl)-aniline | Yellowish orange |
| 60 | $D_5$ | N-($\beta$-sulfoethyl)-aniline | Yellowish orange |
| 61 | $D_5$ | N-($\beta$-acetoxyethyl)-N-($\beta$-sulfoethyl)-aniline | Yellowish orange |
| 62 | $D_1$ | 3-methyl-N-($\beta$-cyanoethyl)-N-($\beta$-sulfoethyl)-aniline | Orange |
| 63 | $D_2$ | 3-chloro-N-($\beta$-carboxyethyl)-N-($\beta$-sulfoethyl)-aniline | Yellowish orange |
| 64 | $D_3$ | 3-chloro-N-($\beta$-hydroxyethyl)-N-($\beta$-sulfoethyl)-aniline | Red |
| 65 | $D_{12}$ | 3-methyl-N-($\beta$-acetoxyethyl)-N-($\beta$-sulfoethyl)-aniline | Blueish red |
| 66 | $D_5$ | N-ethyl-N-($\gamma$-sulfo-$\beta$-hydroxypropyl)-aniline | Yellow |
| 67 | $D_6$ | 3-methyl-N-methyl-N-($\gamma$-sulfo-$\beta$-hydroxypropyl)-aniline | Orange |
| 68 | $D_6$ | 3-chloro-N-($\beta$-cyanoethyl)-N-($\gamma$-sulfo-$\beta$-hydroxypropyl)-aniline | Orange |
| 69 | $D_{13}$ | N-($\beta$-carboxyethyl)-N-($\gamma$-sulfo-$\beta$-hydroxypropyl)-aniline | Orange |
| 70 | $D_9$ | 2-methoxy-5-chloro-N-($\beta$-sulfoethyl)-aniline | Yellowish red |
| 71 | $D_4$ | 2-hydroxy-N-($\gamma$-sulfo-$\beta$-hydroxypropyl)-aniline | Red |
| 72 | $D_1$ | 3-chloro-N-($\gamma$-sulfopropyl)-aniline | Reddish orange |
| 73 | $D_{12}$ | N-methyl-N-($\beta$-sulfo-$\alpha$-methylethyl)-aniline | Orange |
| 74 | $D_{13}$ | 3-methyl-N-ethyl-N-($\gamma$-sulfopropyl)-aniline | Yellowish red |
| 75 | $D_4$ | 2-chloro-N-($\gamma$-sulfo-$\beta$-hydroxypropyl)-aniline | Blueish red |
| 76 | $D_3$ | N-ethyl-N-($\gamma$-sulfopropyl)-aniline | Bordeaux |
| 77 | $D_1$ | N,N-bis-($\beta$-sulfoethyl)-3-chloroaniline | Reddish orange |
| 78 | $D_4$ | N,N-bis-($\beta$-sulfoethyl)-3-methylaniline | Yellowish red |
| 79 | $D_7$ | N-($\beta$-hydroxyethyl)-N-($\beta$-sulfoethyl)-3-chloroaniline | Yellowish orange |
| 80 | $D_5$ | N,N-bis-($\gamma$-sulfo-$\beta$-hydroxypropyl)-3-chloroaniline | Yellowish orange |
| 81 | $D_9$ | N-ethyl-N-($\beta$-sulfoethyl)-3-methylaniline | Reddish orange |
| 82 | $D_{12}$ | N,N-bis-($\beta$-sulfoethyl)-aniline | Reddish orange |

DIAZO COMPONENTS 3-amino-1-$\beta$-($\beta'$-chloroethylsulfonyl)-ethylcarbamoylbenzene 4-chloro-3-amino-1-$\beta$-($\beta'$-chloroethylsulfonyl)-ethylcarbamoylbenzene 4-methyl-3-amino-1-β-(β'-chloroethylsulfonyl)-ethyl-carbamoylbenzene 4-methoxy-3-amino-1-β-(β'-chloroethylsulfonyl)-ethyl-carbamoylbenzene 3-amino-1-β[-β'-(β''-chloroethylsulfonyl)-ethyloxy]-ethylcarbamoylbenzene 3-amino-1-γ-(β'-chloroethylsulfonyl)-propylcarbamoylbenzene 3-amino-1-bis-[β-(β'-chloroethylsulfonyl)-ethyl]carbamoylbenzene 3-amino-1-bis-[γ-(β'-chloroethylsulfonyl)-propyl]carbamoylbenzene 4-amino-1-β-(β'-chloroethylsulfonyl)-ethylcarbamoylbenzene 4-amino-1-β[β'-(β''-chloroethylsulfonyl)-ethyloxy]-ethylcarbamoylbenzene 4-amino-1-γ-(β'-chloroethylsulfonyl)-propylcarbamoylbenzene 4-amino-1-bis-[β-(β'-chloroethylsulfonyl)-ethyl]carbamoylbenzene 4-amino-1-bis-[γ-(β'-chloroethylsulfonyl)-propyl]carbamoylbenzene

EXAMPLE 83

33 parts of 3-amino-1-β-(β'-chloroethylsulfonyl)ethylcarbamoylbenzene hydrochloride are added with stirring to 300 parts of water. 46 parts of 31% hydrochloric acid are then added, and the suspension is cooled down to about 5°. At that temperature 20 parts by volume of an aqueous 5N sodium nitrite solution are gradually added dropwise, which is followed by stirring for about 1 to 2 hours. The excess nitrous acid is destroyed with a little amidosulfonic acid.

For the coupling reaction, an aqueous solution of 23 parts of 3-aminoacetanilide-4-sulfonic acid are added, and the pH value is adjusted to about 4 while gradually adding sodium bicarbonate. After the coupling has ended, the pH value is adjusted to 5.5 to 6.0, and the resulting azo compound is isolated by spray-drying the aqueous solution.

This gives a yellow-orange electrolyte-containing powder which contains the sodium salt of the compound of the formula

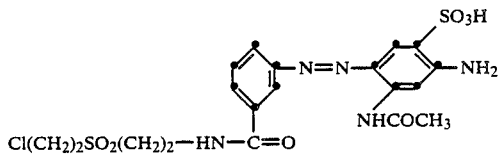

This compound has very good dye properties and is very highly suitable for dyeing (including printing) for example cellulose fibers, such as cotton, by the application and fixing methods customary for fiber-reactive dyes. It produces bright golden yellow dyeings and prints having good light and wet fastness properties. Satisfactory dyeings and prints which are distinguished by bright golden yellow shades of high tintorial strength and by very good light and wet fastness properties are likewise obtained on wool.

EXAMPLE 84

Example 1 is repeated to prepare an azo compound according to the invention, except that the coupling component used there is replaced by 24.4 parts of 3-aminopropylaminobenzene-4-sulfonic acid, affording on working up the synthesis batch the sodium salt of the compound of the formula

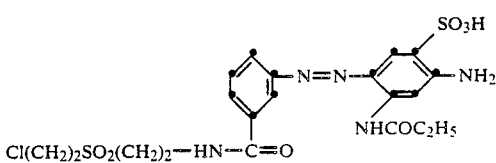

which likewise is a valuable dye having fiber-reactive properties. This compound according to the invention, applied by the customary application and fixing methods for fiber-reactive dyes, likewise dyes cellulose fiber materials in bright golden yellow shades having good light and wet fastness properties. It likewise produces on wool deep level dyeings having a bright golden yellow hue and very good light and wet fastness properties.

EXAMPLE 85

35.5 parts of 4-methoxy-3-amino-1-β-(β'-chloroethylsufonyl)-ethylcarbamoylbenzene hydrochloride are added with stirring to 280 parts of water. After addition of 36 parts of 31% hydrochloric acid the suspension is cooled down to 5°. At that temperature 20 parts by volume of an aqueous 5N sodium nitrite solution are gradually added dropwise, and the reaction batch is subsequently stirred for about an hour. Excess nitrous acid is subsequently destroyed with a little amidosulfonic acid.

To carry out the coupling reaction, a solution of 23 parts of 3-aminoacetanilide-4-sulfonic acid in about 150 parts water is added to the above diazonium salt solution, while the pH is adjusted to about 4 and maintained there by means of sodium bicarbonate. After the coupling has ended, the pH value is raised to 5.5 to 6, and the resulting azo compound according to the invention is precipitated by means of potassium chloride, is filtered off with suction and is dried at 60° under reduced pressure. The azo compound can also be isolated by spray-drying the aqueous solution.

This gives an orange electrolyte-containing powder which contains the alkali metal salt, such as predominantly the potassium salt or the sodium salt, of the formula

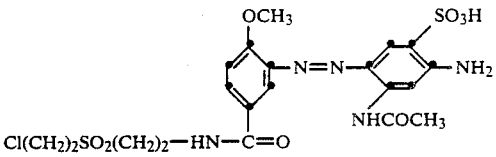

The compound according to the invention is highly suitable for use as a dye and, applied by the application and fixing methods customary and known for fiber-reactive dyes, produces on cotton and wool bright orange dyeings and prints having very good fastness properties, which have been previously mentioned in the description.

EXAMPLE 86

Example 2 is repeated to prepare an azo compound according to the invention, except that the coupling component used there is replaced by 24.4 parts of 3-aminopropionylaminobenzene-4-sulfonic acid, affording the corresponding azo compound according to the invention with the propionylamino group in the coupling component. This compound according to the invention likewise has very good dye properties and produces, for example on cotton, dyeings and prints having the same shade and exactly the same good fastness properties.

EXAMPLE 87

33 parts of 4-amino-1-β-(β'-chloroethylsulfonyl)ethylcarbamoylbenzene hydrochloride are added with stirring to 300 parts of water. 36 parts of 31% hydrochloric acid are then added, and the suspension is cooled down to about 5°. At that temperature 20 parts by volume of an aqueous 5N sodium nitrite solution are gradually added dropwise, and the reaction batch is subsequently stirred for about 1 to 2 hours. The excess nitrous acid is destroyed with a little amidosulfonic acid.

To carry out the coupling reaction, an aqueous solution of 23 parts of 3-amino-β-carboxylpropionylaminobenzene-4-sulfonic acid is added, and the pH value is adjusted to about 4 by gradually adding sodium bicarbonate. After the coupling has ended, the pH value is adjusted to 5.5 to 6.0, and the resulting azo compound is isolated by spray-drying the aqueous solution.

This gives a yellow-orange electrolyte-containing powder which contains a sodium salt of the compound of the formula

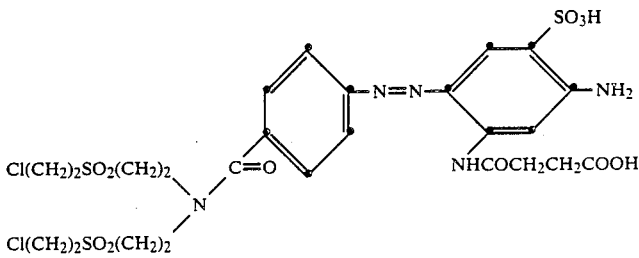

This compound has very good dye properties and is very highly suitable for dyeing (including printing) for example cellulose fibers, such as cotton, by the application and fixing methods customary for fiber-reactive dyes. The compound produces bright golden yellow dyeings and prints having good light and wet fastness properties. Satisfactory dyeings and prints which are distinguished by bright golden yellow shades of high tinctorial strength and by very good light and wet fastness properties are likewise obtained on wool.

EXAMPLE 88

44 parts of 4-amino-1-bis-β-(β'-chloroethylsulfonyl)-ethylcarbamoylbenzene hydrochloride are added with stirring to 300 parts of water. 36 parts of 31% hydrochloric acid are then added, and the suspension is cooled down to about 5°. At that temperature 20 parts by volume of an aqueous 5N sodium nitrite solution are gradually added dropwise, and the reaction batch is subsequently stirred for about 1 to 2 hours. The excess nitrous acid is destroyed with a little amidosulfonic acid.

To carry out the coupling reaction, an aqueous solution of 23 parts of 3-aminoacetanilide-4-sulfonic acid is added, and the pH value is adjusted to about 4 by gradually adding sodium bicarbonate. After the coupling has ended, the pH value is adjusted to 5.5 to 6.0, and the resulting azo compound is isolated by spray-drying the aqueous solution.

This gives a yellow-orange electrolyte-containing powder which contains the sodium salt of the compound of the formula

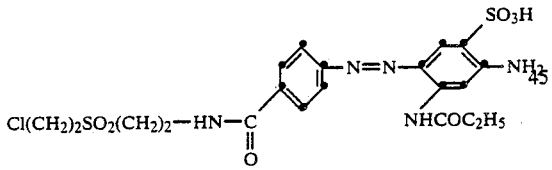

This compound has very good dye properties and is very highly suitable for dyeing, including printing, for example cellulose fibers, such as cotton, by the application and fixing methods customary for fiber-reactive dyes. The compound produces bright golden yellow dyeings and prints having good light and wet fastness properties. Satisfactory dyeings and prints which are distinguished by bright golden yellow shades of high tinctorial strength and by very good light and wet fastness properties are likewise obtained on wool.

EXAMPLE 89

The diazotization and coupling method of Example 1 is followed, except that the coupling component indicated there is replaced by 32.1 parts of 3-amino-α-bromoacryloylaminobenzene-4-sulfonic acid. After the synthesis has ended, the reaction solution is spray-dried. This gives an orange-brown electrolyte-containing powder which contains the sodium salt of the compound of the formula

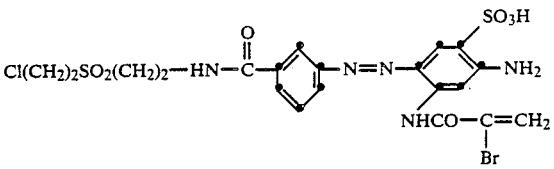

This azo compound according to the invention, applied by the dyeing methods customary for fiber-reactive dyes, produces on cotton and wool golden yellow dyeing and prints having very good light and wet fastness properties, such as the fastness properties mentioned in the description.

EXAMPLE 90

To prepare an azo compound according to the invention the procedure of Example 4 is followed, except that the coupling component used there is replaced by 29.2 parts of 3-amino-o-carboxylbenzoylaminobenzene-4-sulfonic acid. Isolation of the resulting azo compound by spray-drying gives an electrolyte-containing yellow-brown powder of the sodium salt of the compound of the formula

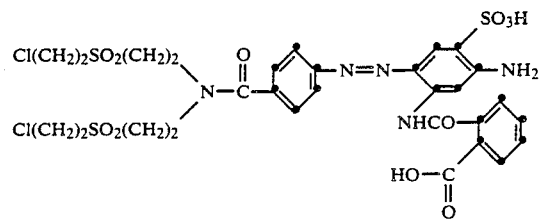

This azo compound according to the invention has very good fiber-reactive dye properties and produces in the usual manner on cotton and wool bright reddish yellow dyeings and prints having good light fastness and very good resistance to wash treatments.

EXAMPLE 91

Example 1 is repeated, except that the coupling component used there is replaced by 34.2 parts of 3-amino-p-tosylaminobenzene-4-sulfonic acid. Isolation gives the sodium salt of the compound of the formula

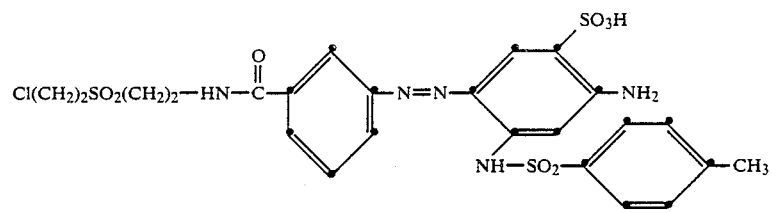

which on cotton and wool produces dyeings and prints having a deep reddish yellow hue and good fastness properties.

EXAMPLE 92

To prepare a compound according to the invention, Example 1 is followed, except that the coupling component used there is replaced by 27.3 parts of 3-amino-N'-isopropylureidobenzene-4-sulfonic acid. Isolating the synthesized azo compound by spray-drying gives a yellow-brown electrolyte-containing powder which contains the sodium salt of the compound of the formula

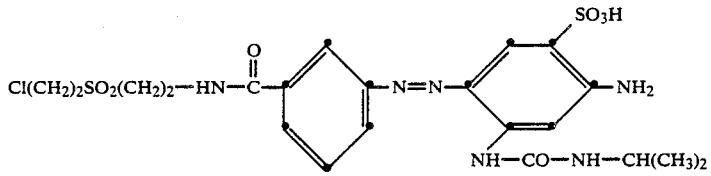

and which produces on cotton and wool by the application methods customary for fiber-reactive dyes deep golden orange dyeings and prints having good light fastness and very good wash fastness properties.

EXAMPLE 93

A suspension of 33 parts of 4-amino-1-$\beta'$($\beta'$-chloroethylsulfonyl)-ethylcarbamoylbenzene hydrochloride in 100 parts of water, 100 parts of ice and 21 parts of a concentrated aqueous hydrochloric acid has gradually added to it an aqueous solution of 7.5 parts of sodium nitrite. This is followed by a further hour of stirring and destruction of excess nitrite with amidosulfonic acid.

To carry out the coupling reaction, the diazonium salt suspension thus prepared has added to it a neutral aqueous solution of 32.2 parts of 3-amino-4-sulfophenylurea. This solution can be prepared in a conventional manner from 18.8 parts of 1,3-diaminobenzene-4-sulfonic acid with 8.7 parts of potassium cyanate at a pH value of 5. The coupling mixture is subsequently stirred at a pH value of 2.5 for 3 to 4 hours, and the pH value of the synthesis solution is adjusted to 4 to 6. The azo compound according to the invention is isolated by spray-drying.

This gives a yellow-brown electrolyte-containing powder which contains the alkali metal salt, predominantly the sodium salt, of the compound of the formula

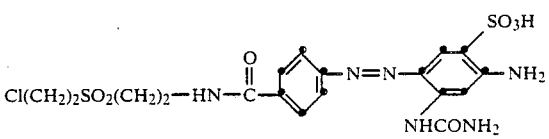

which has good fiber-reactive dye properties, which has a very high affinity from long liquors and which, applied by customary application and fixing methods for fiber-reactive dyes, produces on cotton dyeing and prints having a reddish yellow hue and good light and wet fastness properties.

EXAMPLE 94

35 parts of 4-chloro-3-amino-1-$\beta$-($\beta'$-chloroethylsulfonyl)-ethylcarbamoylbenzene hydrochloride are added with stirring to 280 parts of water. After addition of 36 parts of 31% hydrochloric acid, the suspension is cooled down to 5°. At that temperature 20 parts by volume of an aqueous 5N sodium nitrite solution are gradually added dropwise, and the reaction batch is subsequently stirred for about another hour. Excess nitrous acid is subsequently destroyed with a little amidosulfonic acid.

To carry out the coupling reaction, a solution of 23 parts of 3-aminoacetanilide-1-sulfonic acid in about 150 parts of water is added to the above diazonium salt solution, while the pH value is adjusted to about 4 and maintained there by means of sodium bicarbonate. After the coupling has ended, the pH value is raised to 5.5 to 6, and the resulting azo compound according to the invention is precipitated by means of potassium chloride, is filtered off with suction and is dried at 60° under reduced pressure. The azo compound can also be isolated by spray-drying the aqueous solution.

This gives a golden yellow electrolyte-containing powder which contains the alkali metal salt, such as predominantly the potassium salt or the sodium salt, of the formula

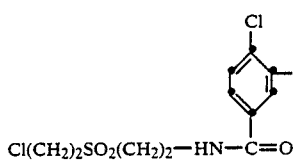

The compound according to the invention is highly suitable for use as a dye and, applied by the application and fixing methods customary and known for fiber-reactive dyes, produces on cotton and wool bright slightly reddish yellow dyeings and prints having very good fastness properties, which have been mentioned before in the description.

EXAMPLE 95

34.1 parts of 4-methyl-3-amino-1-$\beta$-($\beta'$-chloroethylsulfonyl)-ethylcarbamoylbenzene hydrochloride are added with stirring to 280 parts of water. After addition of 36 parts of 31% hydrochloric acid, the suspension is cooled down to 5°. At that temperature 20 parts by volume of an aqueous 5N sodium nitrite solution are gradually added dropwise, and the reaction batch is subsequently stirred for about another hour. Excess nitrous acid is subsequently destroyed with a little amidosulfonic acid.

To carry out the coupling reaction, a solution of 23 parts of 3-aminoacetanilide-1-sulfonic acid in about 150 parts of water is added to the above diazonium salt solution, while the pH value is set to about 4 and maintained there by means of sodium bicarbonate. After the coupling has ended, the pH value is raised to 5.5 to 6, and the resulting azo compound according to the invention is precipitated by means of potassium chloride, is filtered off with suction and is dried at 60° under reduced pressure. The azo compound can also be isolated by spray-drying the aqueous solution.

This gives a golden yellow electrolyte-containing powder which contains the alkali metal salt, such as predominantly the potassium salt or the sodium salt, of the formula

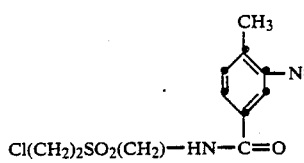

The compound according to the invention is highly suitable for use as a dye and, applied by the application and fixing methods customary and known for fiber-reactive dyes, produces on cotton and wool bright slightly reddish yellow dyeings and prints having very good fastness properties, which have been mentioned before in the description.

Further reactive dyes can be obtained if the diazo and coupling components mentioned in Table 2 below are reacted with each other in accordance with the methods of the preceding examples.

TABLE 2

| Example | Diazo component | Coupling component | Hue on cotton |
|---|---|---|---|
| 96 | $D_1$ | 3-aminoacryloylaminobenzene-4-sulfonic acid | Reddish yellow |
| 97 | $D_2$ | 3-aminoisobutyrylamionbenzene-1-sulfonic acid | Reddish yellow |
| 98 | $D_{12}$ | 3-amino-3'-chlorobenzoylaminobenzene-4-sulfonic acid | Yellowish orange |
| 99 | $D_{13}$ | 3-amino-3'-sulfobenzoylaminobenzene-4-sulfonic acid | Yellowish orange |
| 100 | $D_5$ | 3-aminomethanesulfonylaminobenzene-4-sulfonic acid | Reddish yellow |
| 101 | $D_6$ | 3-amino-$\beta$-hydroxyethylsulfonylaminobenzene-4-sulfonic acid | Reddish yellow |
| 102 | $D_7$ | 3-aminobenzenesulfonylaminobenzene-4-sulfonic acid | Yellowish orange |
| 103 | $D_8$ | 3-aminochloroacetanilide-4-sulfonic acid | Reddish yellow |
| 104 | $D_{12}$ | 3-amino-N'-cyclohexylureidobenzene-4-sulfonic acid | Yellowish orange |
| 105 | $D_{13}$ | 3-amino-$\beta$-carboxyacryloylaminobenzene-4-sulfonic acid | Reddish yellow |
| 106 | $D_1$ | 3-aminopropionylaminobenzene-4-sulfonic acid | Reddish yellow |
| 107 | $D_9$ | 3-aminoisobutyrylaminobenzene-4-sulfonic acid | Yellow |
| 108 | $D_5$ | 3-amino-N'-cyclohexylureidobenzene-4-sulfonic acid | Yellowish orange |
| 109 | $D_1$ | 3-amino-p-tosylaminobenzene-4-sulfonic acid | Reddish yellow |
| 110 | $D_2$ | 3-aminoethylsulfonylaminobenzene-4-sulfonic acid | Yellowish orange |
| 111 | $D_1$ | 3-amino-N'-isopropylureidobenzene-4-sulfonic acid | Yellowish orange |
| 112 | $D_3$ | 3-aminoacetanilide-4-sulfonic acid | Yellow |
| 113 | $D_9$ | 3-aminoacetanilide-4-sulfonic acid | Yellow |
| 114 | $D_4$ | 3-aminoacetanilide-4-sulfonic acid | Reddish orange |
| 115 | $D_1$ | 3-aminobenzoylaminobenzene-4-sulfonic acid | Orange |
| 116 | $D_2$ | 3-aminobenzenesulfonylaminobenzene-4-sulfonic acid | Yellowish orange |
| 117 | $D_4$ | 3-aminopropionylaminobenzene-4-sulfonic acid | Reddish yellow |
| 118 | $D_{12}$ | 3-aminoureidobenzene-4-sulfonic acid | Yellowish orange |
| 119 | $D_{13}$ | 3-aminoureidobenzene-4-sulfonic acid | Yellowish orange |
| 120 | $D_5$ | 3-amino-N'-(4''-chlorophenyl)-ureidobenzene-4-sulfonic acid | Orange |
| 121 | $D_6$ | 3-amino-3'-sulfobenzoylaminobenzene-4-sulfonic acid | Reddish yellow |
| 122 | $D_7$ | 3-aminoacetanilide-4-sulfonic acid | Brownish red |
| 123 | $D_8$ | 3-aminoacetanilide-4-sulfonic acid | Yellowish orange |
| 124 | $D_{12}$ | 3-aminoacetanilide-4-sulfonic acid | Yellow |
| 125 | $D_{13}$ | 3-aminoacetanilide-4-sulfonic acid | Golden yellow |
| 126 | $D_1$ | 3-aminovinylsulfonylaminobenzene-4-sulfonic acid | Yellowish orange |
| 127 | $D_9$ | 3-aminochloropropionylaminobenzene-4-sulfonic acid | Orange |
| 128 | $D_5$ | 3-aminosulfopropionylaminobenzene-4-sulfonic acid | Reddish yellow |
| 129 | $D_1$ | 3-aminobenzoylaminobenzene-4-sulfonic acid | Yellow |
| 130 | $D_1$ | 3-aminoureidobenzene-4-sulfonic acid | Yellow |
| 131 | $D_{12}$ | 3-amino-N'-phenylureidobenzene-4-sulfonic acid | Yellow |

TABLE 2-continued

| Example | Diazo component | Coupling component | Hue on cotton |
|---|---|---|---|
| 132 | $D_{13}$ | 3-aminoacetanilide-4-sulfonic acid | Yellowish orange |
| 133 | $D_9$ | 3-aminoureidobenzene-4-sulfonic acid | Yellowish orange |
| 134 | $D_1$ | 3-aminobenzanilide-4-sulfonic acid | Yellowish orange |
| 135 | $D_4$ | 3-aminoacetanilide-4-sulfonic acid | Yellowish brown |
| 136 | $D_5$ | 3-aminoacetanilide-4-sulfonic acid | Reddish yellow |
| 137 | $D_4$ | 3-aminobenzanilide-4-sulfonic acid | Reddish yellow |
| 138 | $D_1$ | 3-aminoacetanilide-4-sulfonic acid | Yellowish orange |
| 139 | $D_1$ | 3-aminoacetanilide-4-sulfonic acid | Reddish yellow |
| 140 | $D_{12}$ | 3-aminoacetanilide-4-sulfonic acid | Yellowish orange |
| 141 | $D_{13}$ | 3-aminoureidobenzene-4-sulfonic acid | Yellowish orange |

The diazo components $D_1$ to $D_{13}$ correspond to the compounds mentioned immediately after Table 1.

EXAMPLE 142

After diazotization in the presence of hydrochloric acid the diazotized solution of 33 parts of 4-amino-1-$\beta$-($\beta'$-chloroethylsulfonyl)-ethylcarbamoylbenzene hydrochloride is added at 0° to 5° and pH 5 to 6 to a solution of 28.4 parts of 1-(2'-sulfophenyl)-3-carboxy-5-pyrazolone, and coupled. The yellow monoazo dye is isolated; it conforms to the formula

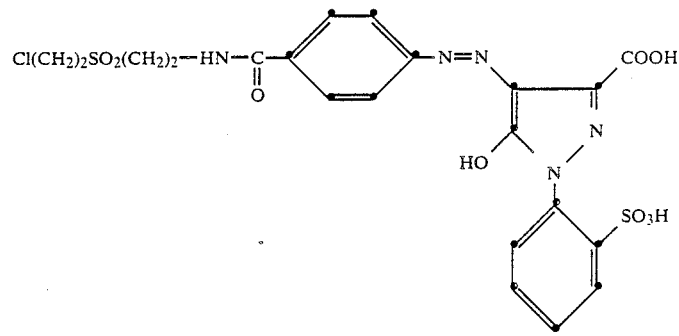

The method of Example 142 can also be used to prepare the reactive dyes of the following formulae.

143 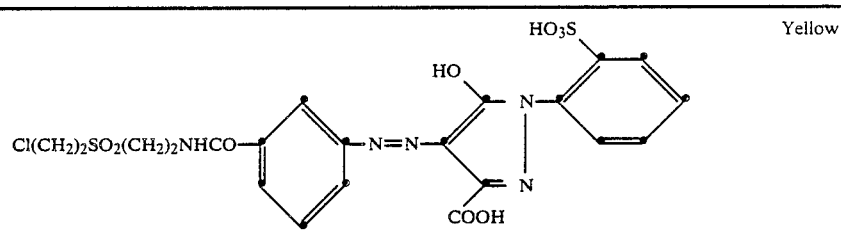 Yellow

144 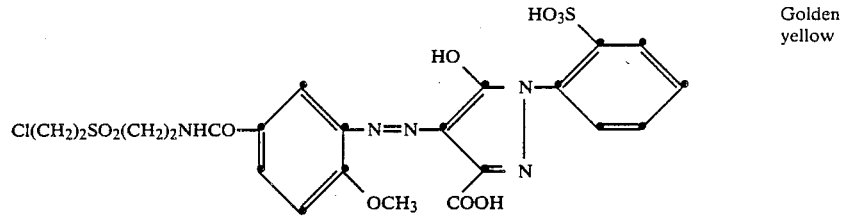 Golden yellow

145 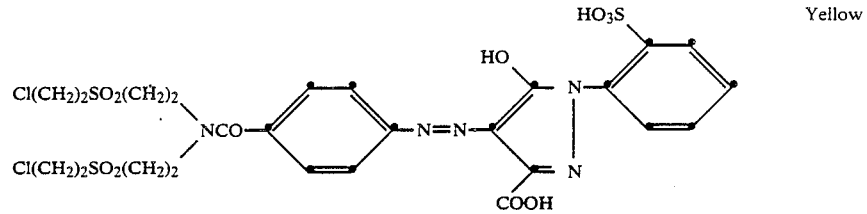 Yellow

-continued

| 146 | 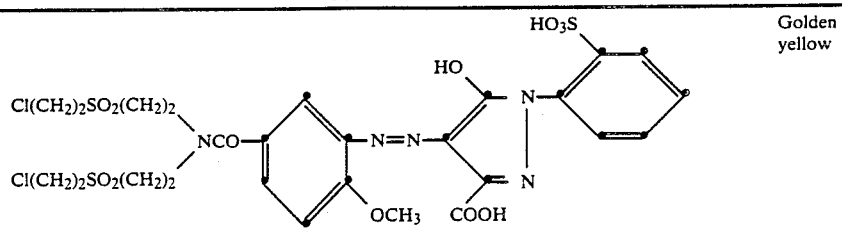 | Golden yellow |
|---|---|---|
| 147 | 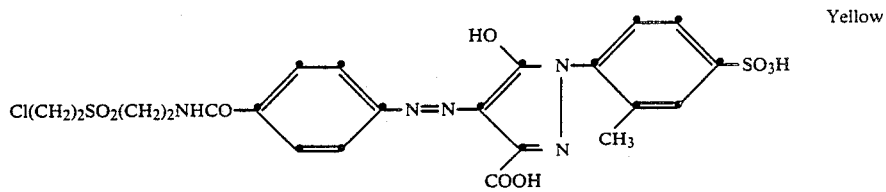 | Yellow |
| 148 | 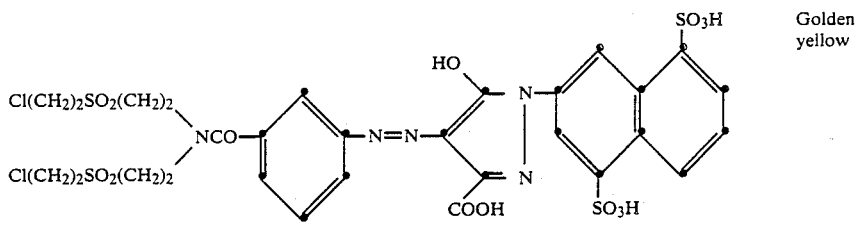 | Golden yellow |
| 149 | 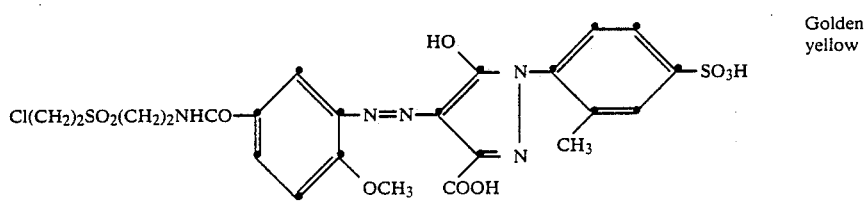 | Golden yellow |
| 150 | 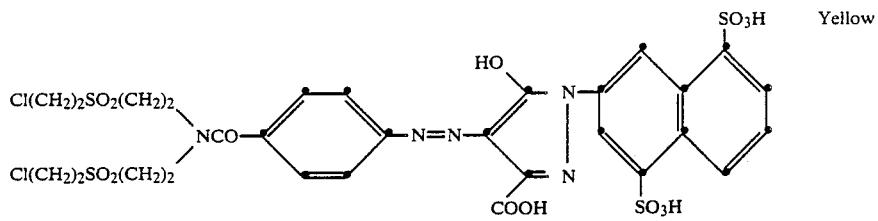 | Yellow |
| 151 | 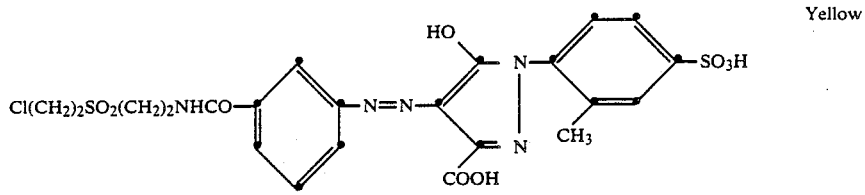 | Yellow |
| 152 | 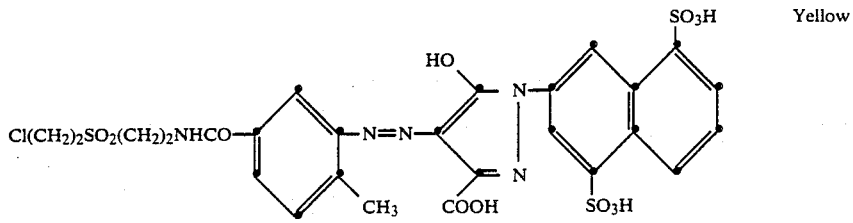 | Yellow |

EXAMPLE 153

After diazotization in the presence of hydrochloric acid the diazotized solution of 32 parts of 4-amino-1-β-(β'-chloroethylsulfonyl)-ethylcarbamoylbenzene hydrochloride is added at 0° to 5° and pH 5 to 7 to a solution of 29 parts of 1-ethyl-3-aminocarbonyl-4-methyl-5-sulfomethyl-6-hydroxypyrid-2-one, and coupled. The yellow monoazo dye is isolated; it conforms to the formula

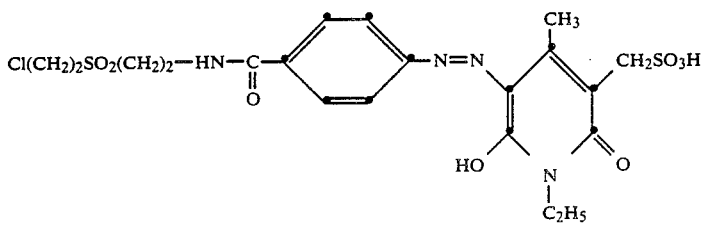

EXAMPLE 154

After diazotization in the presence of hydrochloric acid the diazotized solution of 32 parts of 3-amino-1-β-(β'-chloroethylsulfonyl)-ethylcarbamoylbenzene hydrochloride is added at 0° to 5° and pH 5 to 7 to a solution of 29 parts of 1-ethyl-3-aminocarbonyl-4-methyl-5-sulfomethyl-6-hydroxypyrid-2-one, and coupled. The yellow monoazo dye is isolated; it conforms to the formula drochloride, prepared in the presence of hydrochloric acid, are added dropwise 1,200 parts of a neutral solution of 56.2 parts of 2-acetylamino-5-naphthol-7-sulfonic acid in 400 parts of ice/water mixture, and coupled at pH 6 to 7. The dye is then precipitated with sodium chloride.

The press material is dried by spray-drying. This gives a powder which dyes cotton in pure orange shades and has the following structure:

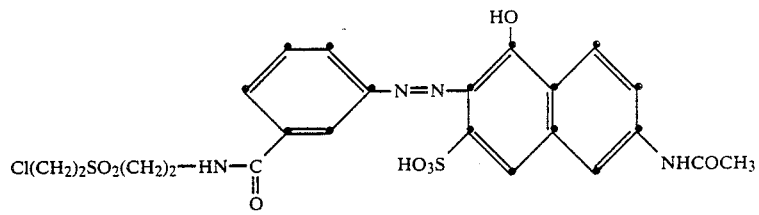

Further dyes which can be prepared by the method

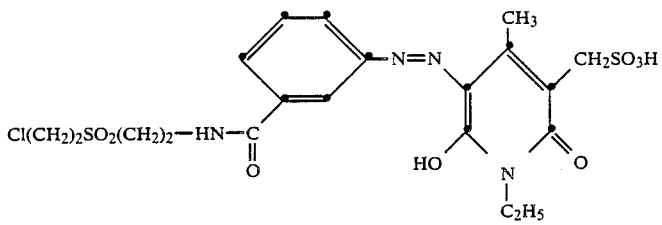

EXAMPLE 155

To a diazotized solution of 66 parts of 3-amino-1-β-(β'-chloroethylsulfonyl)-ethylcarbamoylbenzene hygiven in Example 155 are the reactive dyes of the following formulae.

| 156 | | Scarlet |
|---|---|---|

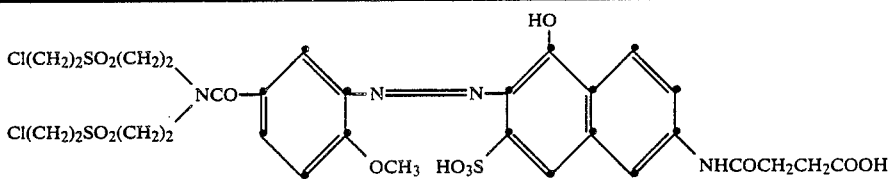

| 157 | | Orange |
|---|---|---|

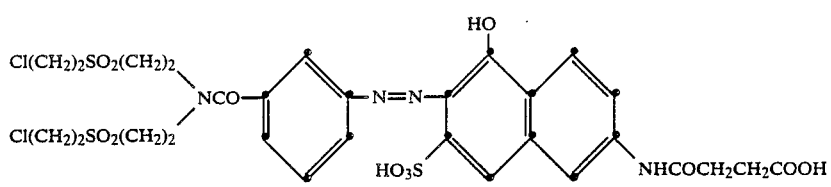

| | | |
|---|---|---|
| 158 | 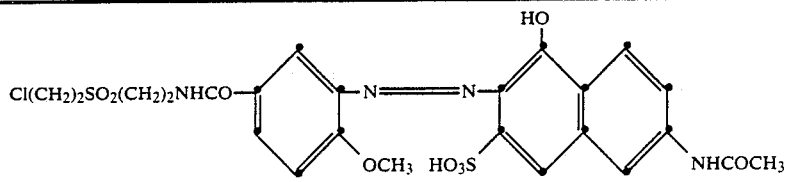 | Scarlet |
| 159 | 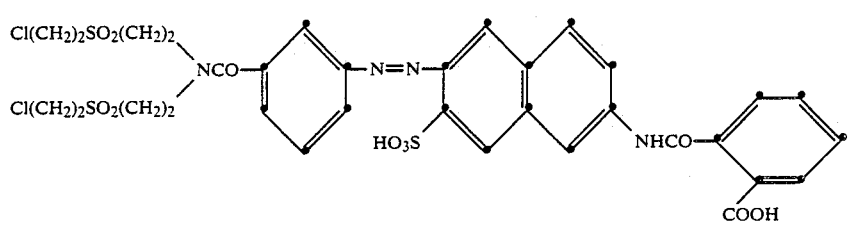 | Orange |
| 160 | 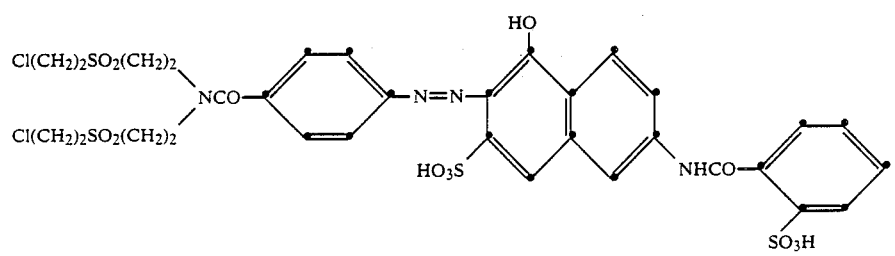 | Orange |
| 161 | 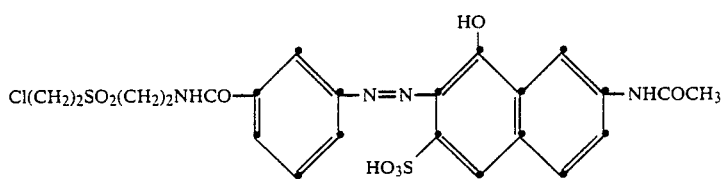 | Scarlet |
| 162 | 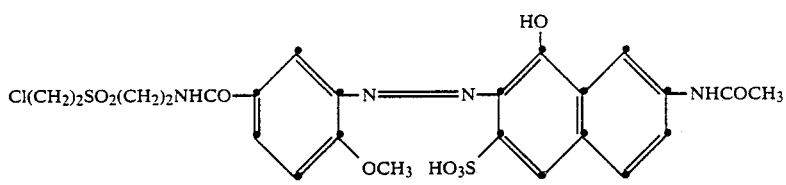 | Red |
| 163 | 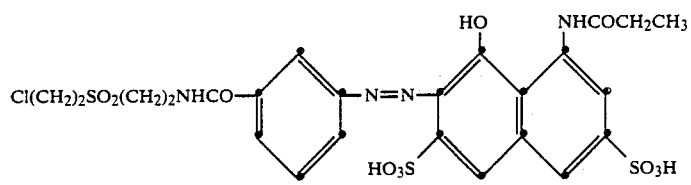 | Yellowish red |
| 164 | 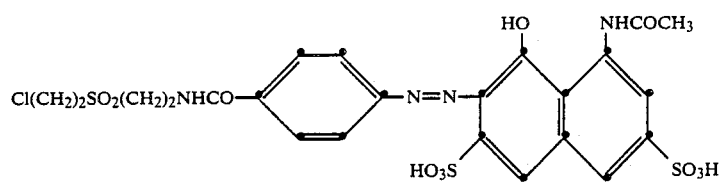 | Red |
| 165 | 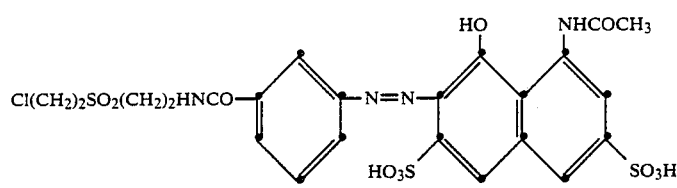 | Yellowish red |

-continued
| | | |
|---|---|---|
| 166 | 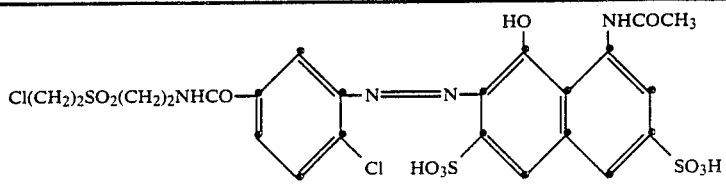 | Yellowish red |
| 167 | 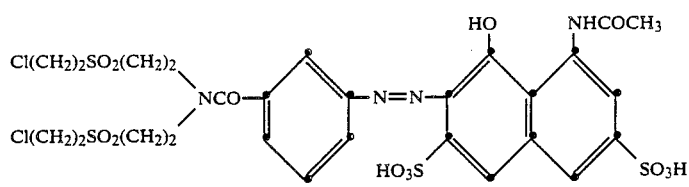 | Yellowish red |
| 168 | 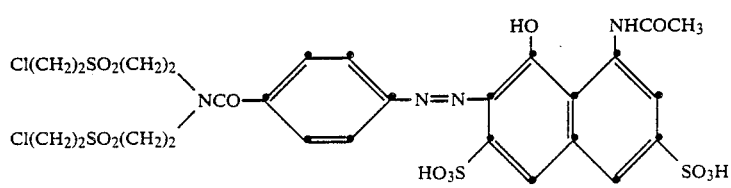 | Yellowish red |
| 169 | 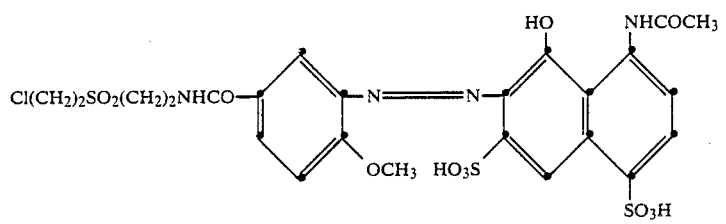 | Red |
| 170 | 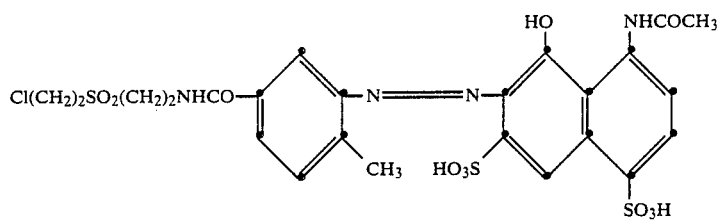 | Red |
| 171 | 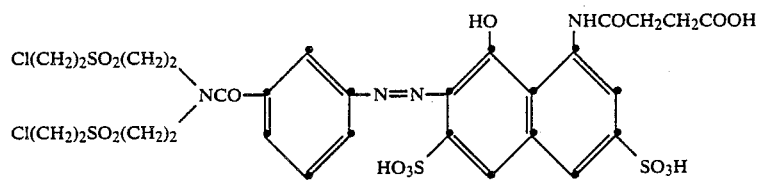 | Yellowish red |
| 172 | 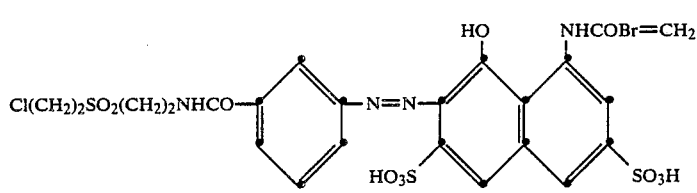 | Yellowish red |
| 173 | 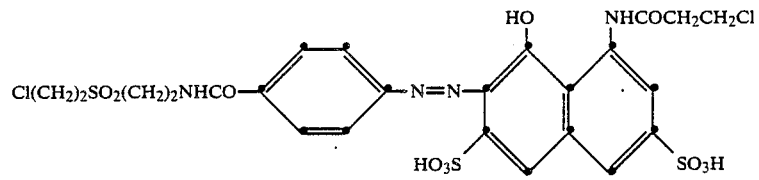 | Yellowish red |

| | | |
|---|---|---|
| 174 | 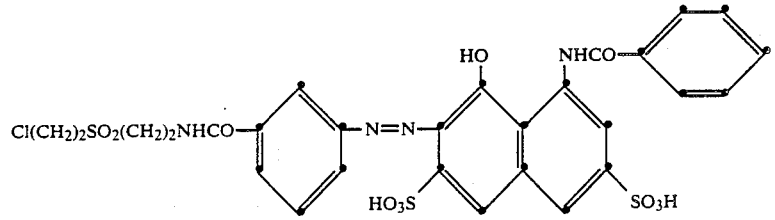 | Red |
| 175 | 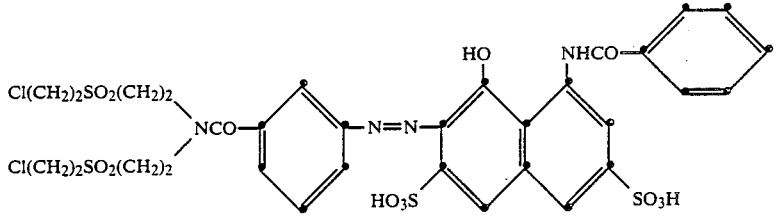 | Red |
| 176 | 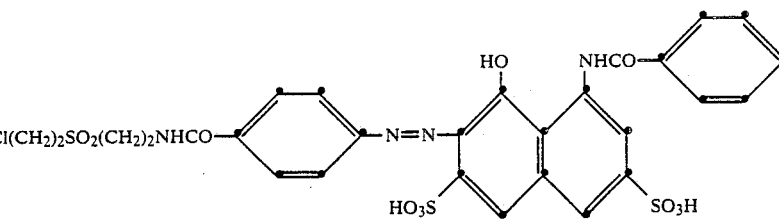 | Red |
| 177 | 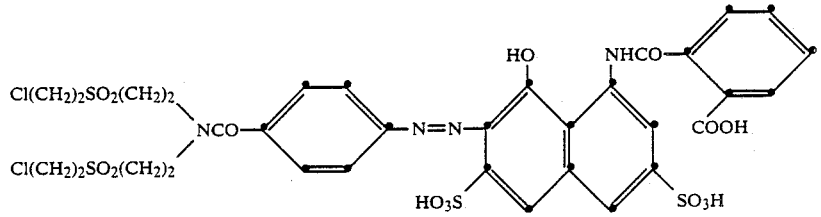 | Red |
| 178 | 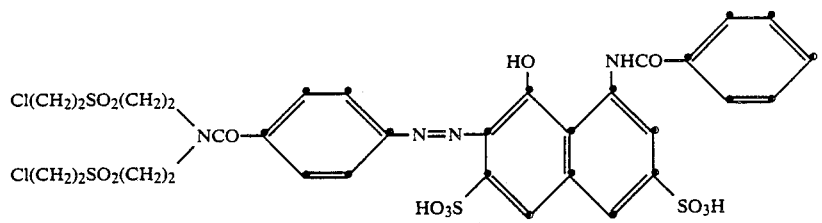 | Red |
| 179 | 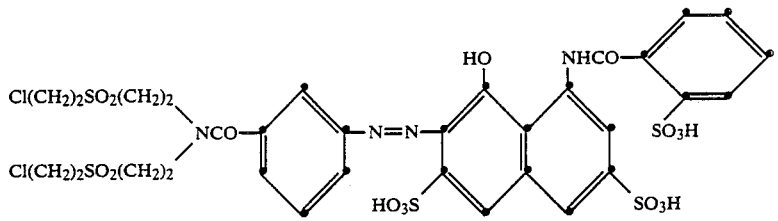 | Red |
| 180 | 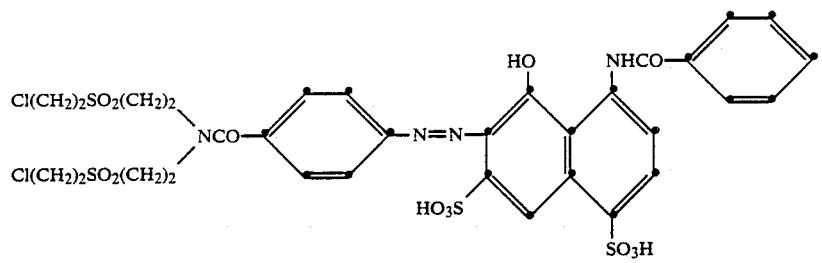 | Red |

| | | |
|---|---|---|
| 181 | 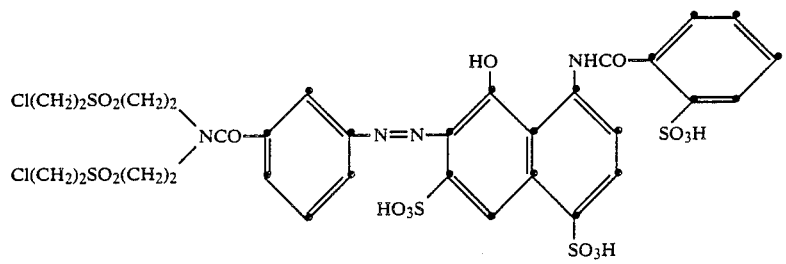 | Red |
| 182 | 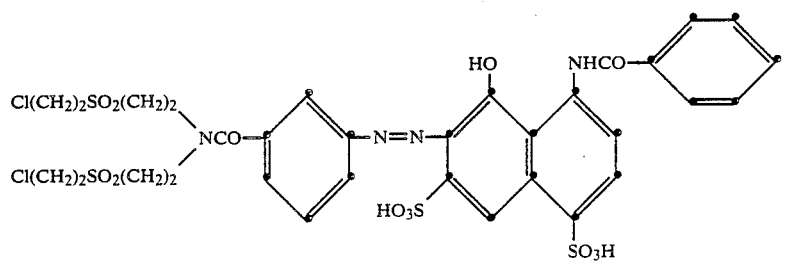 | Red |
| 183 | 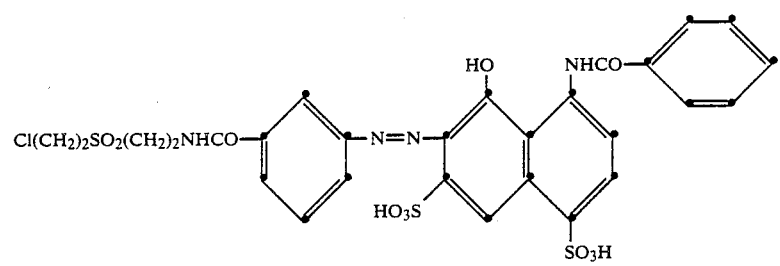 | Red |
| 184 | 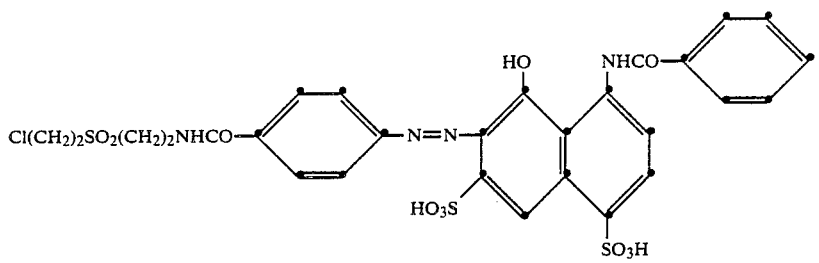 | Red |

EXAMPLE 185

186 parts of 3-nitrobenzoyl chloride are dissolved in 1200 parts of nitrobenzene at room temperature. 210 parts of β-(β-chloroethylsulfonyl)-ethylamine hydrochloride are then added. While stirring thoroughly and passing over nitrogen, the suspension is heated to 100° and is stirred at that temperature for about 3 hours (until 2 moles of hydrochloric acid have been neutralized with sodium hydroxide solution). A solution forms, which is then cooled down to room temperature. In the course of the cooling, the product precipitates. It is filtered off and the filter cake is washed with methanolic solution until free of nitrobenzene. (Instead of the treatment with methanol the nitrobenzene can be removed by steam distillation.)

This gives 235 parts of analytically pure product of he following structure:

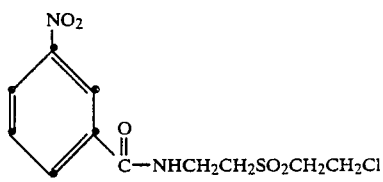

Analysis: theoretical chlorine covalent 11.1% found chlorine covalent 11.2%.

EXAMPLE 186

52 parts of 2′-aminoethyl-2-thioethanol are dissolved at room temperature in 600 parts of chloroform. 50 parts of sodium carbonate are then added at 10° to 20°. 74 parts of 3-nitrobenzoyl chloride, dissolved in 200 parts of chloroform, are then added dropwise (slight exothermic reaction), and the mixture is stirred at room temperature for 1 hour. Then a further 50 parts of sodium carbonate are added, and the reaction is left at room temperature for 12 hours. The sodium chloride formed is removed, and the chloroform is distilled off by means of a high vacuum. The residue is then oxidized by known methods with chlorine/hydrochloric acid mixture to give the product mentioned in Example 185.

EXAMPLE 187

The same product is also obtained on replacing nitrobenzene by o-dichlorobenzene, trichlorobenzene, toluene or benzene etc.

EXAMPLE 188

Example 185 is repeated, except that in place of 186 parts of 3-nitrobenzoyl chloride the same amount of 4-nitrobenzoyl chloride is used, affording the following product:

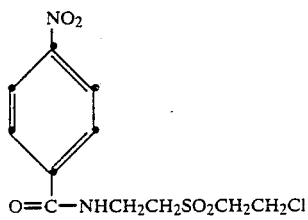

EXAMPLE 189

Example 185 is repeated, except that 210 parts of β-(β-chloroethylsulfonyl)-ethylamine are replaced by an equimolar amount of the γ-(β-chloroethylsulfonyl)-propylamine hydrochloride, affording the following product:

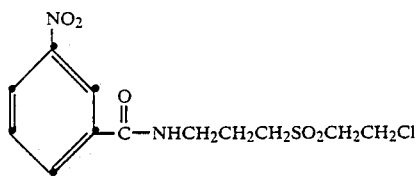

EXAMPLE 190

Example 185 is repeated, except that 210 parts of β-(β-chloroethylsulfonyl)-ethylamine are replaced by equimolar amounts of bis-[β-(β'-chloroethylsulfonyl)-ethyl]-amine hydrochloride, affording the following product:

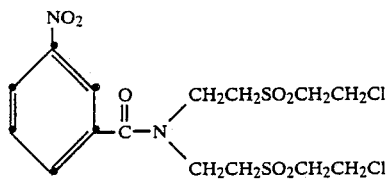

EXAMPLE 191

Example 188 is repeated, except that 210 parts of β-(β'-chloroethylsulfonyl)-ethylamine are replaced by equimolar amounts of bis-[β-(β'-chloroethylsulfonyl)-ethyl]-amine hydrochloride, affording the following product:

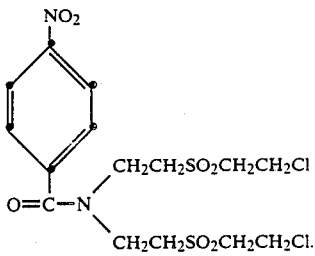

The procedure described in Examples 185 to 191 can be used to synthesize the intermediates of the following formulae.

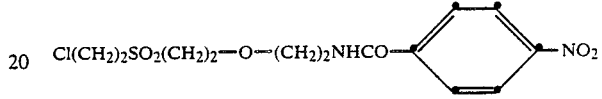

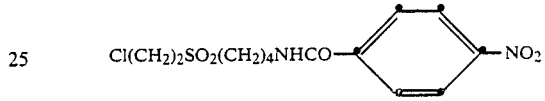

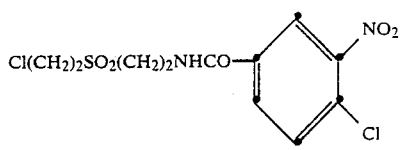

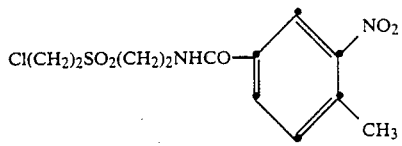

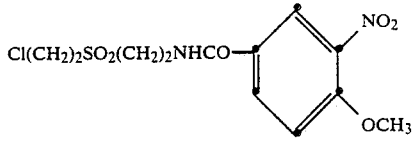

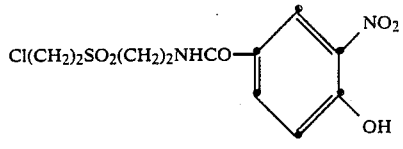

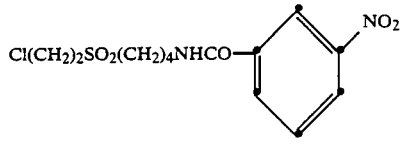

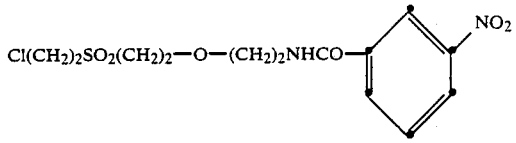

-continued

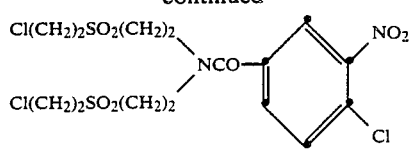

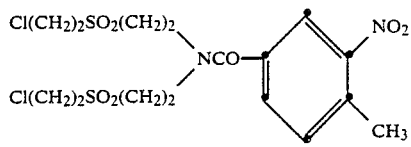

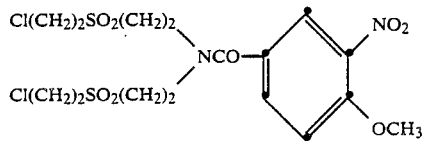

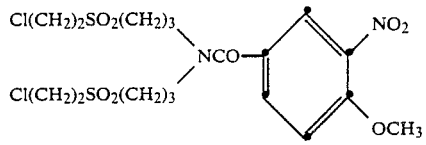

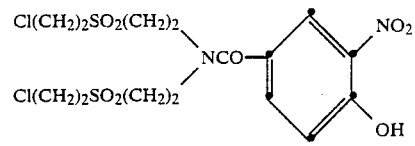

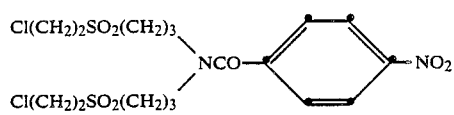

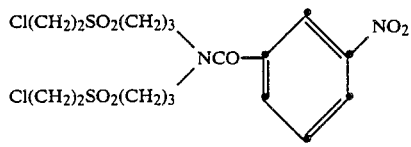

The intermediates described in Examples 185 to 191 and mentioned immediately after Example 191 are catalytically hydrogenated in alcohol, ethyl acetate or tetrahydrofuran at room temperature to about 40° with Pd/carbon or reduced with Fe/hydrochloric acid, in the course of which the nitro group is converted into a —$NH_2$ group. The amines thus obtained are used according to the invention as starting compounds for preparing the reactive dyes or the formula (1).

EXAMPLE 192

After diazotization in the presence of hydrochloric acid the diazo solution of 37 parts of 1-amino-4-β-(β'-chloroethylsulfonyl)-ethylaminocarbonylbenzene-2-sulfonic acid is added at 0° to 5° and pH 4 to 5 to a solution of 23 parts of 3-amino-acetanilide-4-sulfonic acid, and coupled. The yellow monoazo dye is isolated. It conforms to the formula

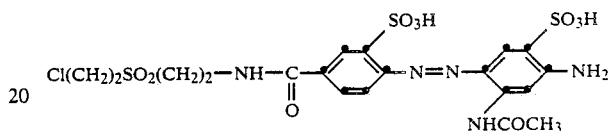

EXAMPLE 193

After diazotization in the presence of hydrochloric acid the diazo solution of 43.5 parts of 1-amino-4-β-(β'-sulfatoethyl)-ethylaminocarbonylbenzene-2-sulfonic acid is added at 0° to 5° and pH 4 to 5 to give a solution of 23 parts of 3-amino-acetanilide-4-sulfonic acid, and coupled. The yellow monoazo dye is isolated. It conforms to the formula

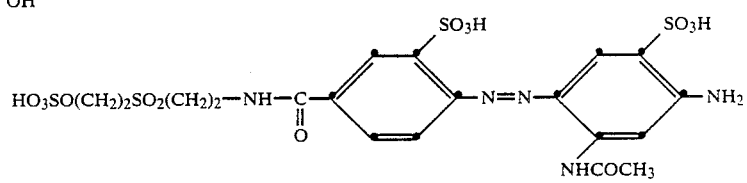

EXAMPLE 194

The dyes mentioned in Examples 192 and 193 are vinylated at room temperature at pH 10 in the course of 30 minutes. The pH value is reduced to 6 with hydrochloric acid. The monoazo dye is isolated. It conforms to formula

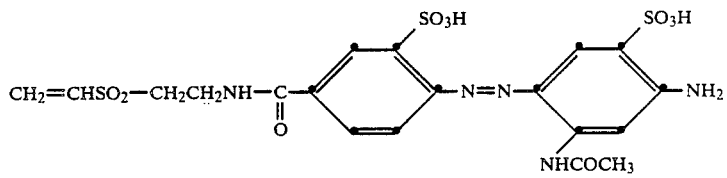

EXAMPLE 195

After diazotization in the presence of hydrochloric acid the diazo solution of 37 parts of 1-amino-4-β-(β'-chloroethylsulfonyl)-ethylaminocarbonylbenzene-2-sulfonic acid is added at 0° to 5° and pH 5 to 6 to a solution of 28.4 parts of 1-(4'-sulfophenyl)-3-carboxy-5-pyrazolone and coupled. The yellow monoazo dye is isolated; it conforms to the formula

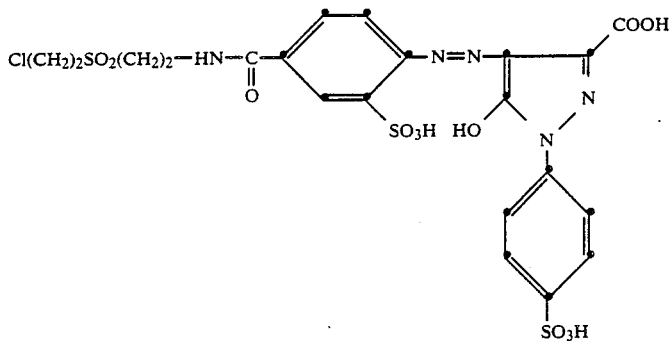

EXAMPLE 196

After diazotization in the presence of hydrochloric acid the diazo solution of 43.5 parts of 1-amino-4-β-(β'-sulfatoethylsulfonyl)-ethylaminocarbonylbenzene-2-sulfonic acid is added at 0° to 5° and pH 5 to 7 to a solution of 29 parts of 1-ethyl-3-aminocarbonyl-4-methyl-5-sulfomethyl-6-hydroxypyrid-2-one, and coupled.

fonic acid, prepared in the presence of hydrochloric acid, are added dropwise 1,200 parts of a neutral solution of 56.2 parts of 2-acetylamino-5-naphthol-7-sulfonic acid in 400 parts of ice/water mixture, and coupled at pH 6 to 7. The dye is then precipitated with sodium chloride. The press material is dried by spray-drying. This gives a powder which dyes cotton in pure orange shades and has the following structure:

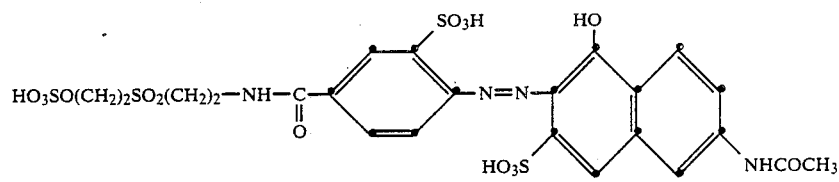

The yellow monoazo dye is isolated; it conforms to the formula

Further dyes which can be prepared by the method given in Examples 192 to 197 are the reactive dyes of the following formulae:

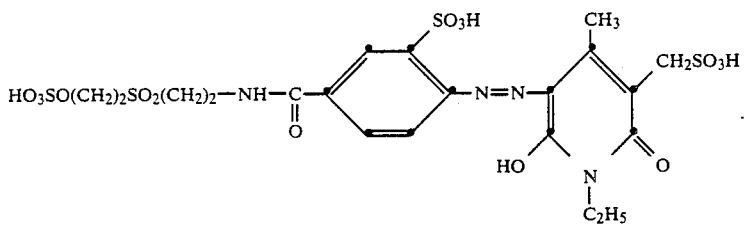

EXAMPLE 197

To a diazo solution of 87 parts of 1-amino-4-β-(β'-sulfatoethylsulfonyl)-ethylaminocarbonylbenzene-2-sul-

| 198 | | Golden yellow |
|---|---|---|
| 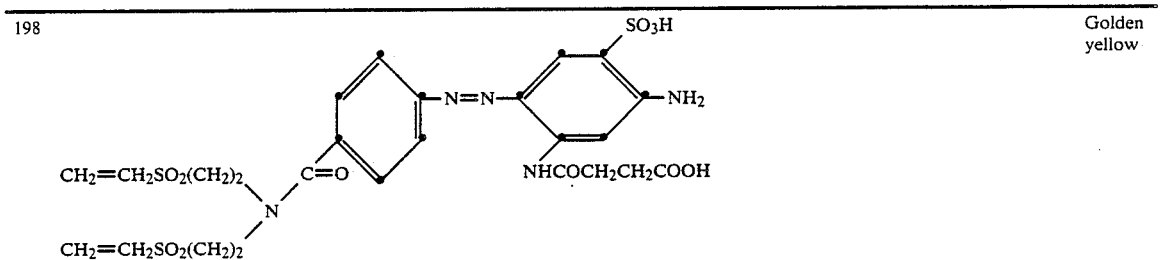 | | |
| 199 | | Golden yellow |
| 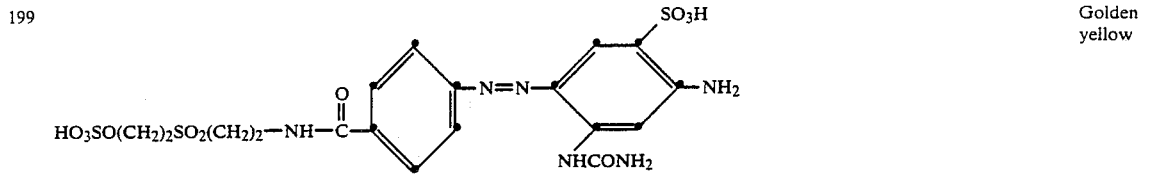 | | |

| No. | Structure | Color |
|---|---|---|
| 200 | (structure: CH₂=CHSO₂(CH₂)₂NHCO—C₆H₃(SO₃)—N=N—C₆H₂(SO₃H)(NH₂)(NHCO—C(=CH₂)Br)) | Golden yellow |
| 201 | H₂C=CH—SO₂(CH₂)₂NHCO—C₆H₃(SO₃H)—N=N—C(OH)=C(COOH)—N=N—C₆H₄—SO₃H | Yellow |
| 202 | HO₃SOH₂CH₂C—SO₂(CH₂)₂NHCO—C₆H₃(OCH₃)—N=N—C(OH)=C(COOH)—N=N—C₆H₄—SO₃H | Golden yellow |
| 203 | (H₂C=CHSO₂(CH₂)₂)₂N—CO—C₆H₃(SO₃H)—N=N—C(OH)=C(COOH)—N=N—C₆H₄—SO₃H | Yellow |
| 204 | (HO₃SOH₂C—H₂CSO₂(CH₂)₂)₂N—CO—C₆H₃(OCH₃)—N=N—C(OH)=C(COOH)—N=N—C₆H₄—SO₃H | Golden yellow |
| 205 | H₂C=CHSO₂(CH₂)₂NHCO—C₆H₃(SO₃H)—N=N—C(OH)=C(COOH)—N=N—C₆H₃(CH₃)—SO₃H | Yellow |
| 206 | (H₂C=CHSO₂(CH₂)₂)₂N—CO—C₆H₃(SO₃H)—N=N—C(OH)=C(COOH)—N=N—naphthalene(SO₃H)₂ | Yellow |
| 207 | H₂C=HCO₂S(H₂C)₃—N(piperazine)N—CO—C₆H₃(OCH₃)—N=N—C(OH)=C(COOH)—N=N—C₆H₄—SO₃H | Golden yellow |

| | | |
|---|---|---|
| 208 | 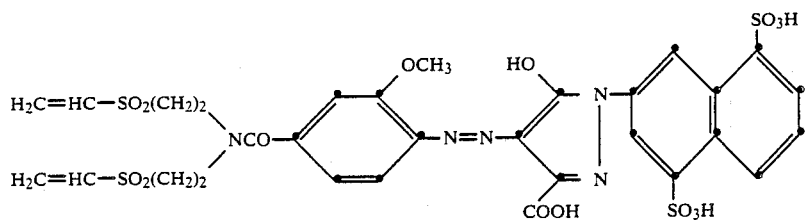 | Golden yellow |
| 209 | 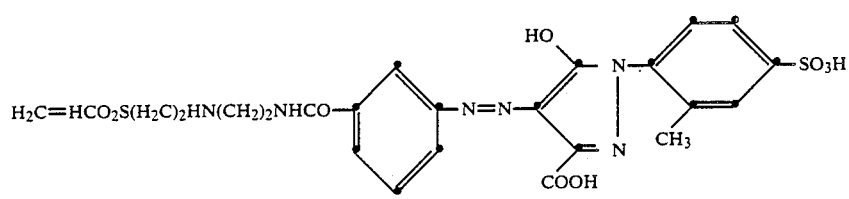 | Yellow |
| 210 | 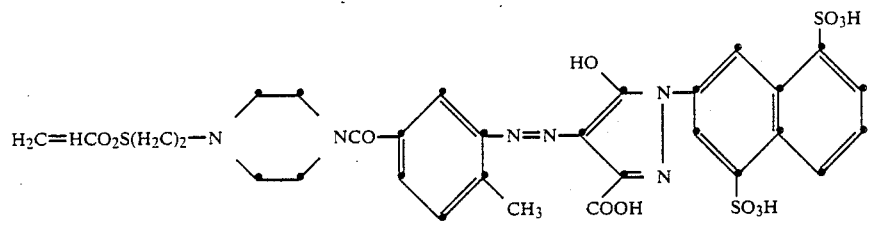 | Yellow |
| 211 | 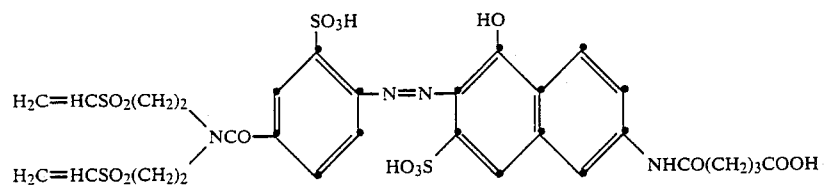 | Orange |
| 212 | 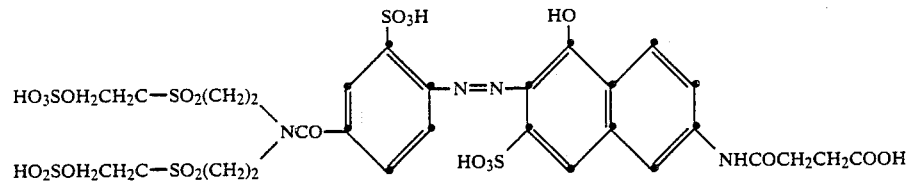 | Orange |
| 213 | 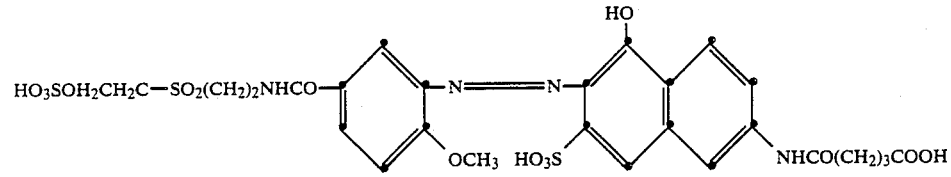 | Scarlet |
| 214 | 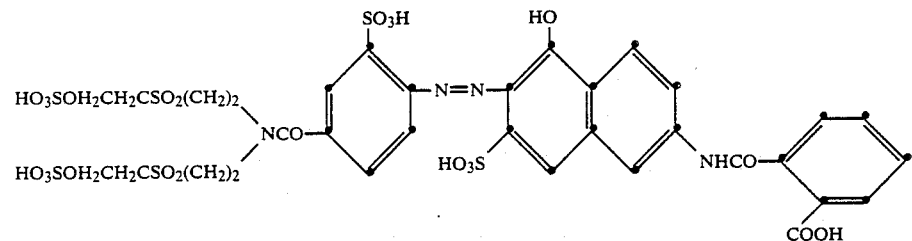 | Orange |

-continued

| No. | Structure | Color |
|---|---|---|
| 215 | (azo dye: H₂C=HCO₂S(H₂C)₂HNCO–C₆H₃(SO₃H)–N=N–naphthalene(OH)(SO₃H)–NHCO(CH₂)₃COOH) | Orange |
| 216 | (azo dye: H₂C=HCO₂S(H₂C)₂HNCO–C₆H₃(SO₃H)–N=N–naphthalene(OH)(SO₃H)–NHCOCH₂CH₂COOH) | Orange |
| 217 | (azo dye: [HO₃SOH₂CH₂CO₂S(H₂C)₂]₂N–CO–C₆H₃(SO₃H)–N=N–naphthalene(OH)(SO₃H)–NHCOCH₃) | Orange |
| 218 | (azo dye: H₂C=HCO₂S(H₂C)₂NHCO–C₆H₃(SO₃H)–N=N–naphthalene(OH)(SO₃H)–NHCO–C₆H₄–COOH) | Orange |
| 219 | (azo dye: [H₂C=HC–SO₂(CH₂)₂]₂N–CO–C₆H₃(OCH₃)–N=N–naphthalene(OH)(SO₃H)–NHCO–C₆H₄–SO₃H) | Scarlet |
| 220 | (azo dye: H₂C=HCSO₂(CH₂)₂NHCO–C₆H₄–N=N–naphthalene(OH)(SO₃H)–NHCOCH₃) | Scarlet |
| 221 | (azo dye: H₂C=HCSO₂(CH₂)₂NHCO–C₆H₃(OCH₃)–N=N–naphthalene(OH)(SO₃H)–NHCO(CH₂)₃COOH) | Red |
| 222 | (azo dye: H₂C=HCSO₂(CH₂)₂HNCO–C₆H₄–N=N–naphthalene(OH)(SO₃H)–NHCOCH₂CH₂COOH) | Scarlet |

| | | |
|---|---|---|
| 223 | 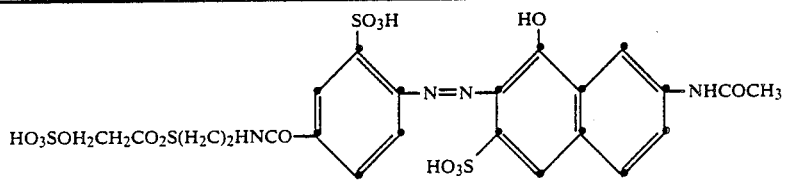 | Scarlet |
| 224 | 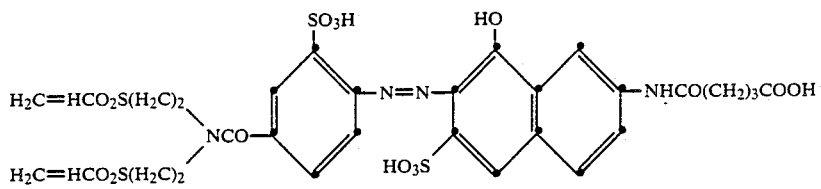 | Scarlet |
| 225 | 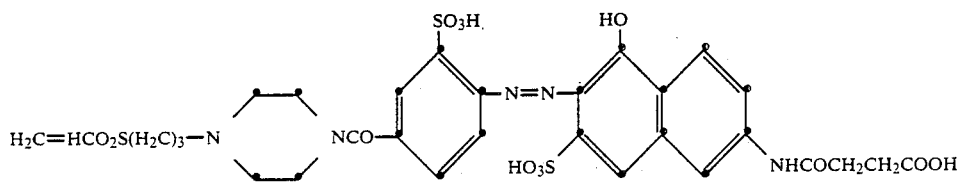 | Orange |
| 226 | 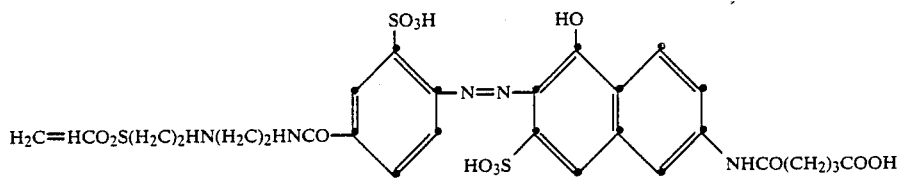 | Orange |
| 227 | 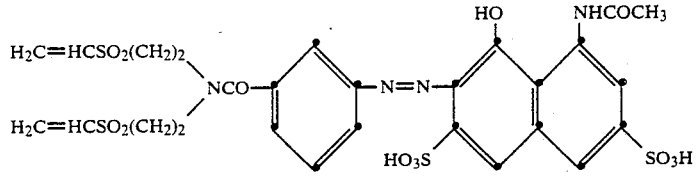 | Yellowish red |
| 228 | 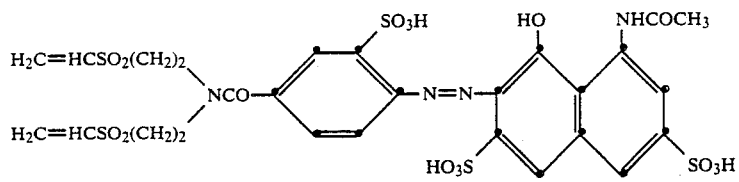 | Yellowish red |
| 229 | 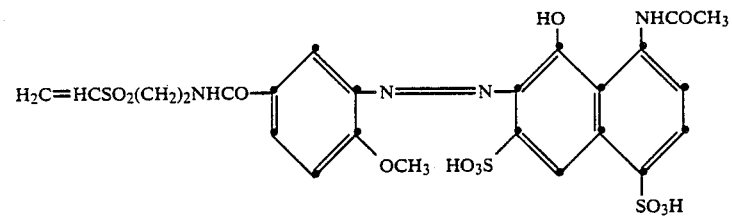 | Red |
| 230 | 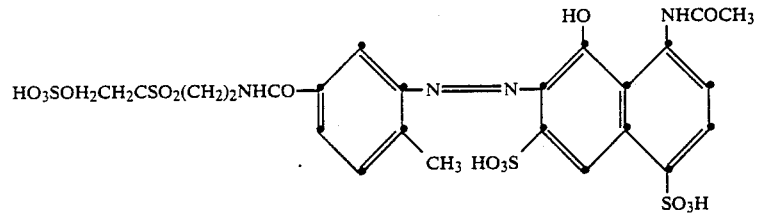 | Red |

| No. | Structure | Color |
|---|---|---|
| 231 | (H₂C=HCSO₂(CH₂)₂)₂N-CO-C₆H₃(SO₃H)-N=N-[naphthalene with OH, NHCOCH₂CH₂COOH, HO₃S, SO₃H] | Yellowish red |
| 232 | H₂C=HCSO₂(CH₂)₂NHCO-C₆H₄-N=N-[naphthalene with OH, NHCOCBr=CH₂, HO₃S, SO₃H] | Yellowish red |
| 233 | H₂C=HCSO₂(CH₂)₂NHCO-C₆H₄-N=N-[naphthalene with OH, NHCOCH₂CH₂Cl, HO₃S, SO₃H] | Yellowish red |
| 234 | H₂C=HCO₂S(H₂C)₂HNCO-C₆H₃(SO₃H)-N=N-[naphthalene with OH, NHCOCH₃, HO₃S, SO₃H] | Yellowish red |
| 235 | HO₃SOH₂CH₂CO₂S(H₂C)₂HNCO-C₆H₃(SO₃H)-N=N-[naphthalene with OH, NHCOCH₃, HO₃S, SO₃H] | Yellowish red |
| 236 | H₂C=HCO₂S(H₂C)₂HNCO-C₆H₃(SO₃H)-N=N-[naphthalene with OH, NHCOCH₃, HO₃S, SO₃H] | Scarlet |
| 237 | H₂C=HCO₂S(H₂C)₂HNCO-C₆H₃(SO₃H)-N=N-[naphthalene with OH, NHCOCH₂CH₂COOH, HO₃S, SO₃H] | Scarlet |
| 238 | H₂C=HCO₂S(H₂C)₂HNCO-C₆H₃(SO₃H)-N=N-[naphthalene with OH, NHCOCH₂CH₂COOH, HO₃S, SO₃H] | Yellowish red |

| No. | Structure | Color |
|---|---|---|
| 239 | Dye with SO₃H, HO, NHCOCBr=CH₂ substituents on naphthalene coupled via N=N to phenyl with SO₃H and H₂C=HCO₂S(H₂C)₂HNCO- group; naphthalene also bears HO₃S and SO₃H | Yellowish red |
| 240 | Naphthalene bearing HO, NHCOCH₂CH₂CH₃, HO₃S, SO₃H azo-coupled to phenyl with SO₃H and H₂C=HC-SO₂(CH₂)₂NHCO- group | Yellowish red |
| 241 | Naphthalene (HO, NHCOCH₃, HO₃S, SO₃H) azo-coupled to phenyl-SO₃H bearing N(CO)[(H₂C)₂SCO₂CH₂SOH₃]₂ group | Yellowish red |
| 242 | Naphthalene (HO, NHCOCH₂CH₂CH₂COOH, HO₃S, SO₃H) azo-coupled to phenyl-SO₃H bearing N(CO)[(H₂C)₂SCO₂CH=CH₂]₂ | Yellowish red |
| 243 | Naphthalene (HO, NHCOCH₃, HO₃S, SO₃H) azo-coupled to phenyl-SO₃H bearing N(CO)[(H₂C)₂SCO₂CH=CH₂]₂ | Scarlet |
| 244 | Naphthalene (HO, NHCOCH₂CH₂CH₂COOH, HO₃S, SO₃H) azo-coupled to phenyl-SO₃H with H₂C=HCO₂S(H₂C)₂HNCO- group | Scarlet |
| 245 | Naphthalene (HO, NHCO(CH₂)₃COOH, HO₃S, SO₃H) azo-coupled to phenyl-SO₃H with H₂C=HCO₂S(H₂C)₂HNCO- group | Yellowish red |
| 246 | Naphthalene (HO, NHCOCBr=CH₂, HO₃S, SO₃H) azo-coupled to phenyl-SO₃H bearing N(CO)[(H₂C)₂SCO₂CH=CH₂]₂ | Yellowish red |

-continued
| | | |
|---|---|---|
| 247 | 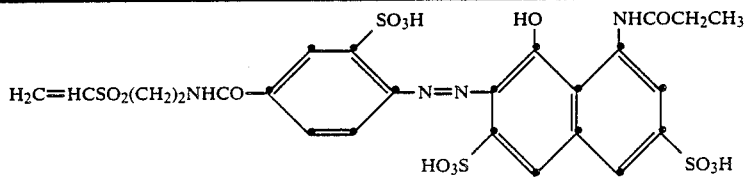 | Yellowish red |
| 248 | 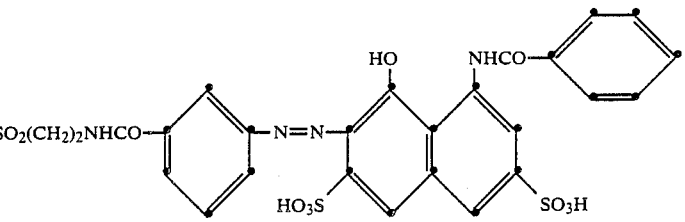 | Red |
| 249 | 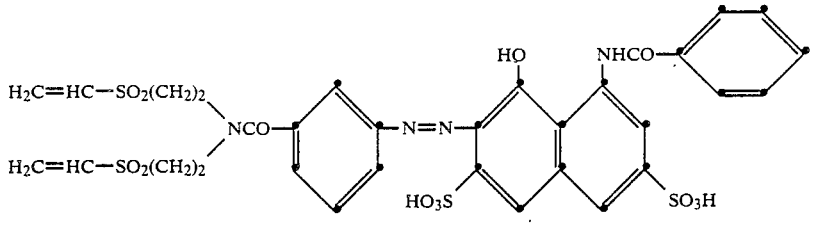 | Red |
| 250 | 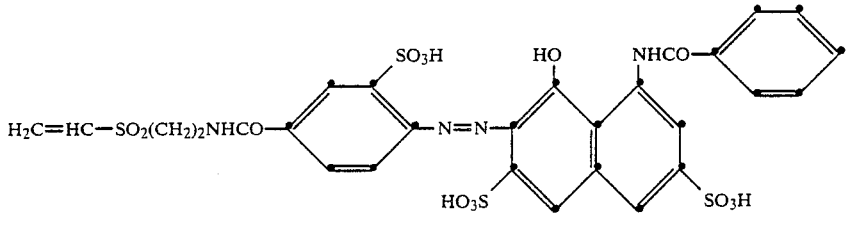 | Red |
| 251 | 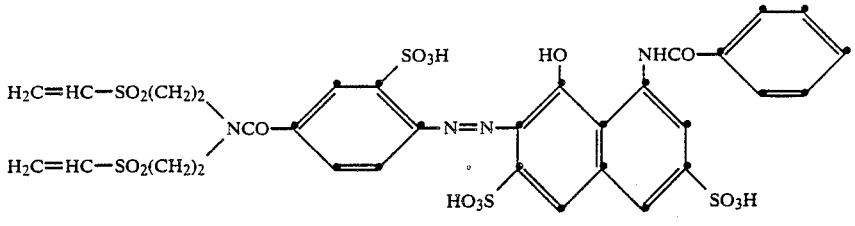 | Red |
| 252 | 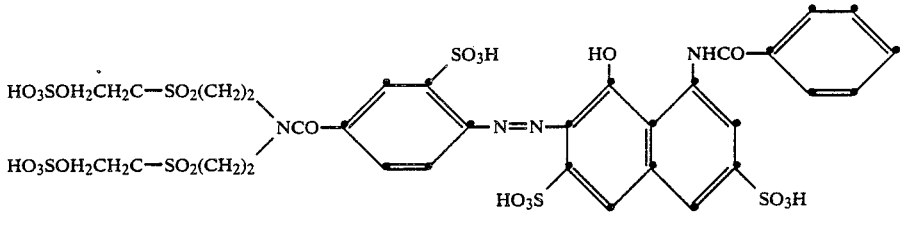 | Red |
| 253 | 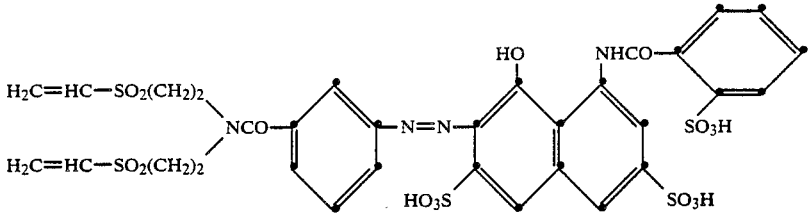 | Red |

-continued
254 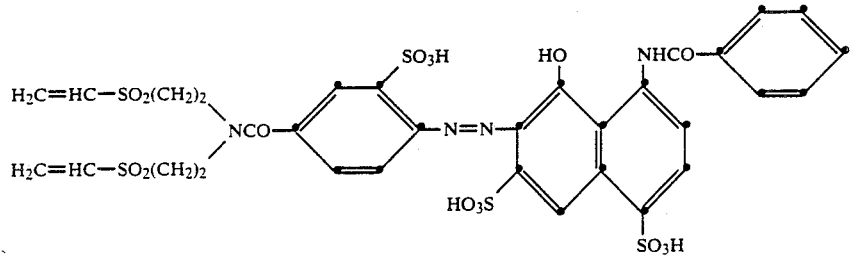 Red
255 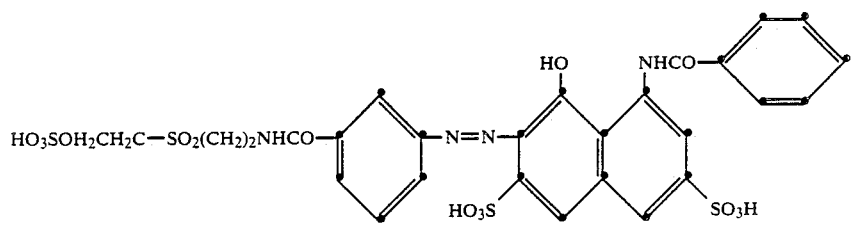 Red
256 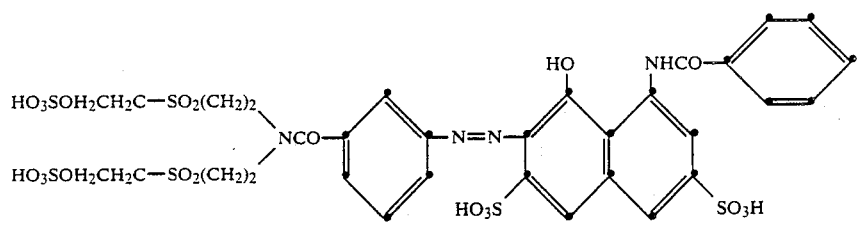 Red
257 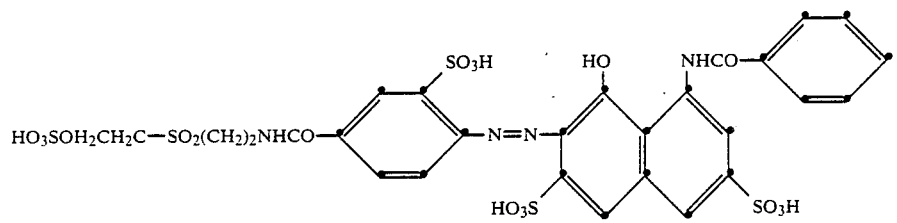 Red
258 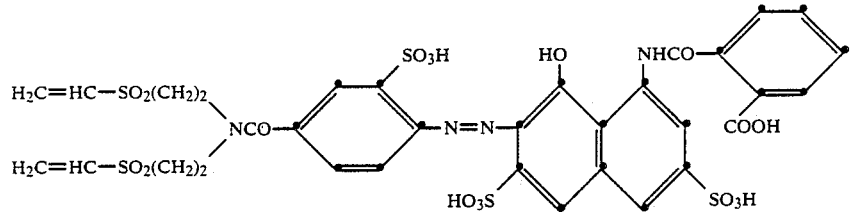 Red
259 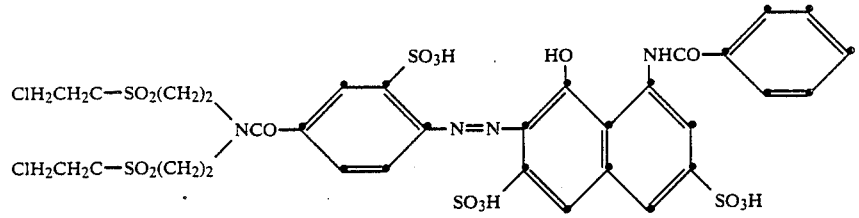 Red
260 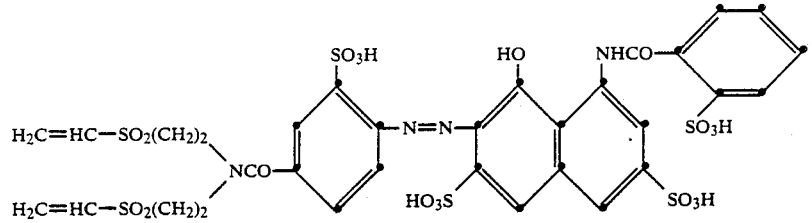 Red 261 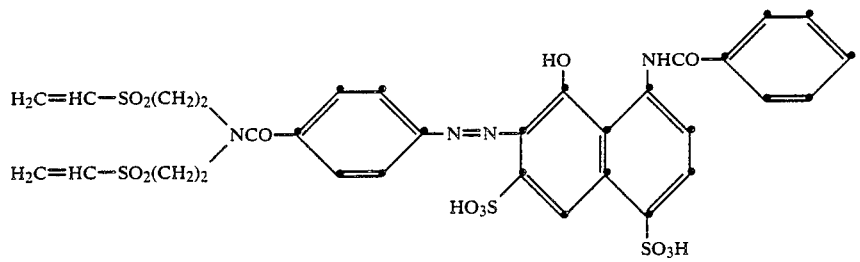 Red
262 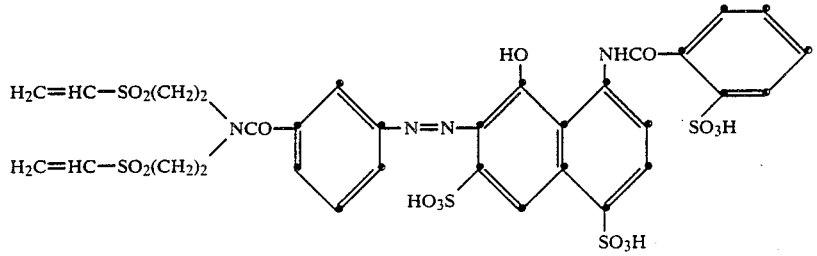 Red
263 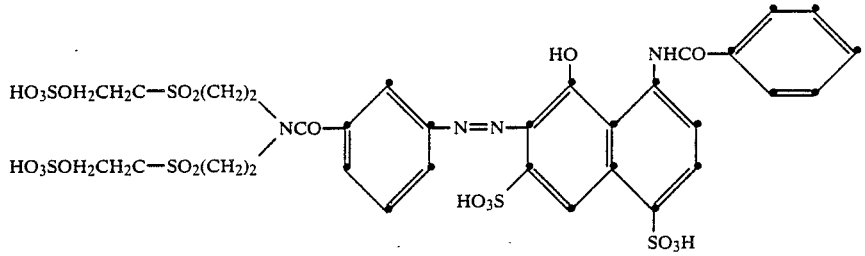 Red
264 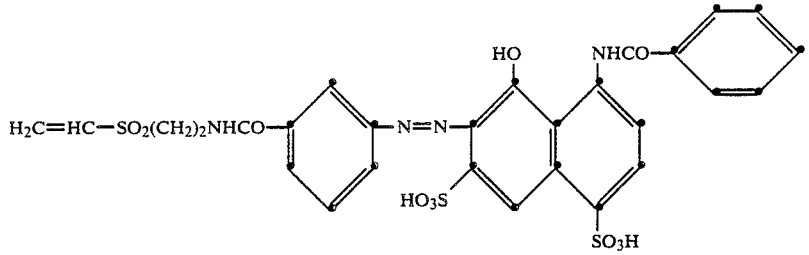 Red
265 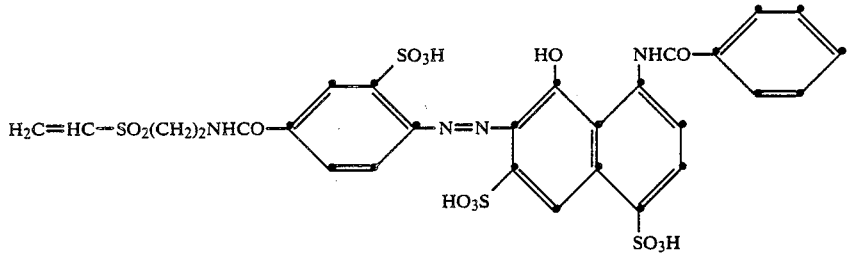 Red
266 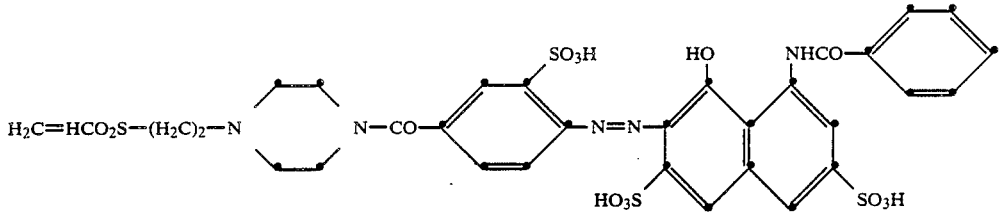 Red -continued
267 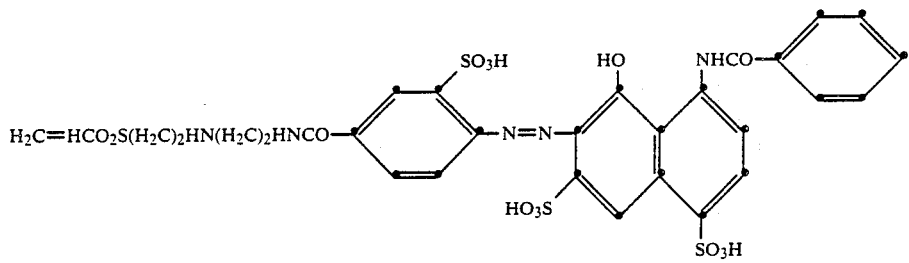 Red
268 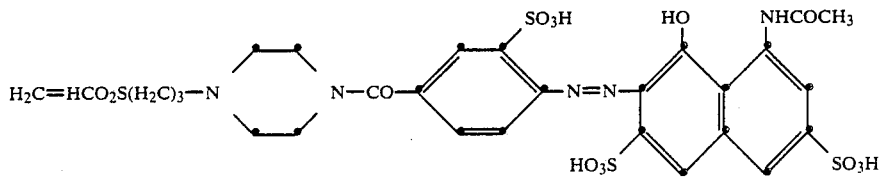 Red
269 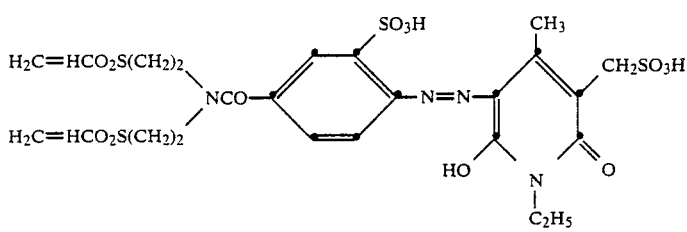 Yellow
270 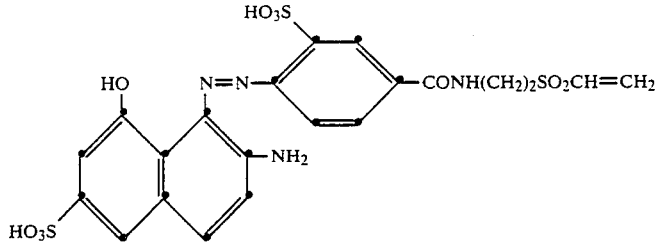 Blueish red
271 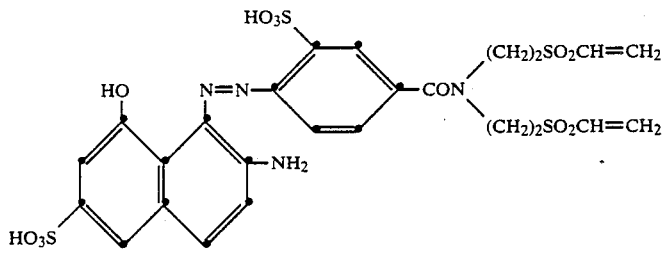 Blueish red
272 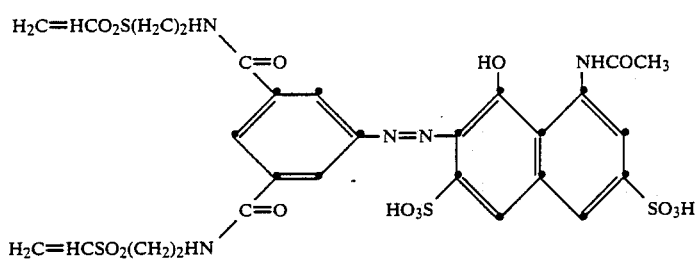 Greenish red

| | | |
|---|---|---|
| 273 | 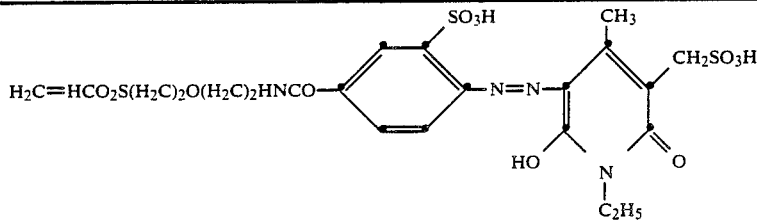 | Greenish yellow |
| 274 | 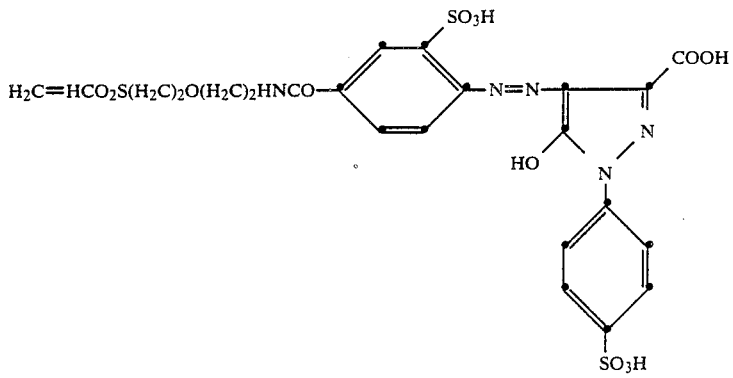 | Greenish yellow |
| 275 | 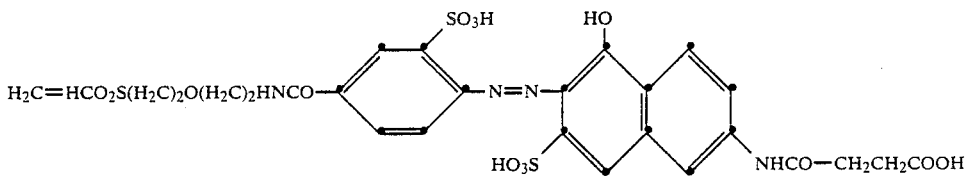 | Orange |
| 276 | 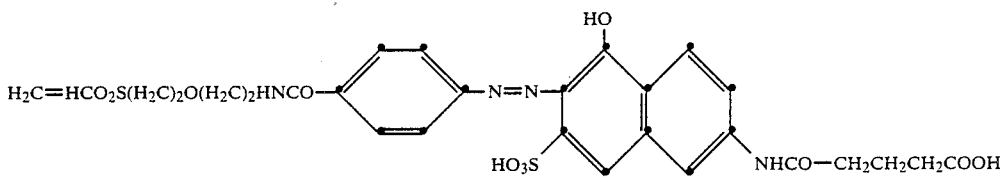 | Orange |
| 277 | 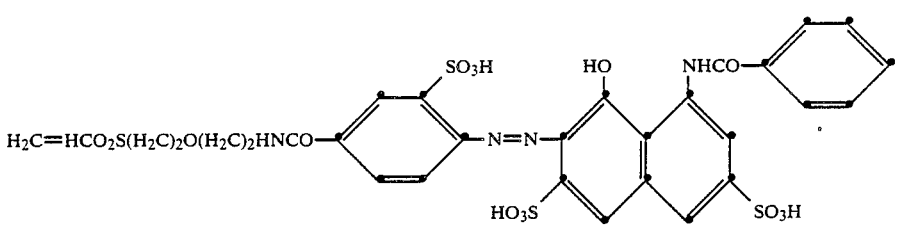 | Red |
| 278 | 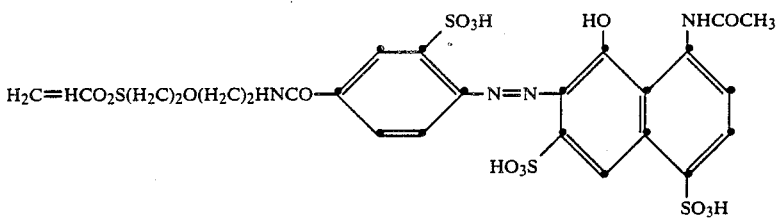 | Scarlet |

DYEING METHOD I 2 parts of the dye obtained in Example 1 are dissolved in 400 parts of water; to this solution are added 1,500 parts of a solution which contains per liter 53 g of sodium chloride. This dyebath is entered at 40° C. with 100 parts of a cotton fabric. After 45 minutes, 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

DYEING METHOD II 2 parts of the reactive dye obtained in Example 1 are dissolved in 400 parts of water; to this solution are added 1,500 parts of a solution which contains per liter 53 g of sodium chloride. This dyebath is entered at 35° C. with 100 parts of a cotton fabric. After 20 minutes, 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

DYEING METHOD III 8 parts of the reactive dye obtained in Example 1 are dissolved in 400 parts of water; to this solution are added 1,400 parts of a solution which contains per liter 100 g of sodium sulfate. This dyebath is then entered at 25° C. with 100 parts of a cotton fabric. After 10 minutes, 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

DYEING METHOD IV 4 parts of the reactive dye obtained in Example 1 are dissolved in 50 parts of water. To this solution are added 50 parts of a solution which contains per liter 5 g of sodium hydroxide and 20 g of calcined sodium carbonate. The resulting solution is applied to a cotton fabric on a padmangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

DYEING METHOD V 6 parts of the reactive dye obtained in Example 1 are dissolved in 50 parts of water. To this solution are added 50 parts of a solution which contains per liter 16 g of sodium hydroxide and 0.04 liter of 38° Be sodium silicate. The resulting solution is applied to a cotton fabric on a padmangle in such a way that its weight increases by 70%, and the fabric is then wound onto a beam. In this state the cotton fabric is left to stand at room temperature for 10 hours. The dyed fabric is then rinsed, is soaped off at the boil with a nonionic detergent for a quarter of an hour, is rinsed once more and is dried.

DYEING METHOD VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% solution of a nonionic detergent for a quarter of an hour, is rinsed and is dried.

PRINTING METHOD I 3 parts of the reactive dye obtained in Example 1 are sprinkled with high-speed stirring into 100 parts of a stock thickening containing 50 parts of 5% sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

PRINTING METHOD II 5 parts of the reactive dye obtained in Example 1 are sprinkled with high-speed stirring into 100 parts of a stock thickening containing 50 parts of 5% sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

I claim:

1. A reactive dye of the formula

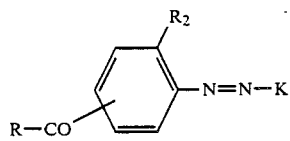

in which R is a radical of the formula

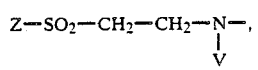

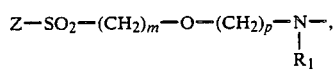

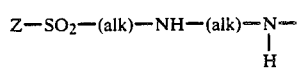

or 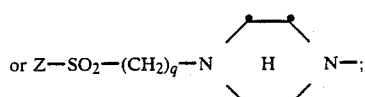

Z is β-sulfatoethyl, β-thiosulfatoethyl, β-phosphatoethyl, β-acetoxyethyl, β-halogenoethyl or vinyl; V is hydrogen or a radial

in which Z is as defined above; $R_1$ is hydrogen or $C_{1-6}$-alkyl; alk, independently of each other, are polymethylene radicals having 2 to 6 C atoms or their branched isomers; K is a benzene, naphthalene, 1-phenyl- or 1- naphthylpyrazolone or pyridone radical which is unsubstituted or is substituted by $C_1$–$C_4$-alkyl, $C_1$–$C_4$-alkoxy, $C_1$–$C_8$-acylamino, $C_1$–$C_4$-alkylamino, phenylamino, N,N-di-β-hydroxyethylamino, N,N-di-β-sulfatoethylamino, sulfobenzylamino, N,N-di-sulfobenzylamino, $C_1$–$C_4$-alkoxycarbonyl, $C_1$–$C_4$-alkylsulfonyl, trifluoromethyl, nitro, cyano, halogen, carbamoyl, N-$C_1$–$C_4$-alkylcarbamoyl, sulfamoyl, N-$C_1$–$C_4$-alkylsulfamoyl, N-(β-hydroxyethyl)-sulfamoyl, N,N-di-(β-hydroxyethyl)sulfamoyl, N-phenylsulfamoyl, ureido, hydroxyl, carboxyl, sulfomethyl, sulfo or amino; $R_2$ is sulfo; m is 1 to 6, p is 1 to 6 and 8 is 1 to 6.

2. A reactive dye according to claim 1, of the formula

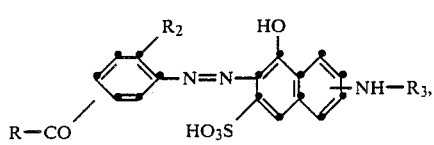

in which $R_3$ is hydrogen, $C_{1-4}$-alkyl or $C_{1-4}$-alkanoyl.

3. A reactive dye according to claim 1, in which $R_3$ is acetyl.

4. A reactive dye according to claim 1, of the formula

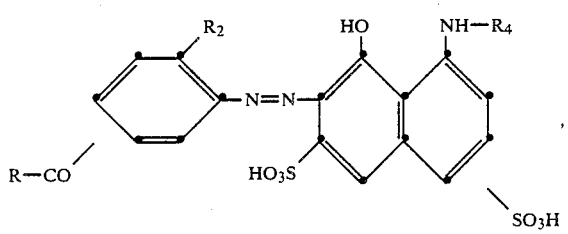

in which $R_4$ is hydrogen, $C_{1-4}$-alkanoyl or benzoyl.

5. A reactive dye according to claim 4, in which $R_4$ is benzoyl.

6. A reactive dye according to claim 1, of the formula

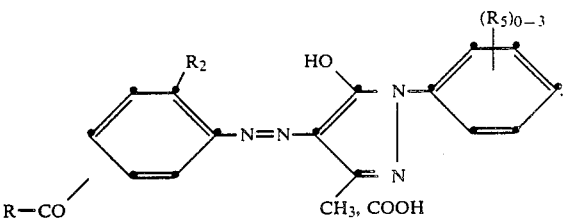

in which $R_5$ is 0 to 3 mutually independent substituents of the group chlorine, methyl, methoxy, carboxyl and sulfo.

7. A reactive dye according to claim 1, of the formula

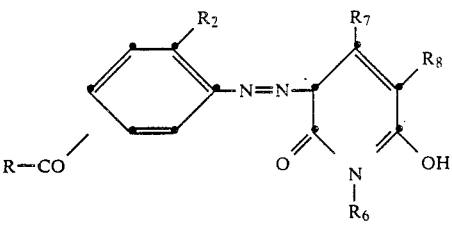

in which $R_6$ and $R_7$ are independently of each other hydrogen, $C_{1-4}$-alkyl or phenyl, and $R_8$ is hydrogen, cyano, carbamoyl or sulfomethyl.

8. A heavy metal complex of a reactive dye according to claim 1.

9. A reactive dye according to claim 1, in which Z is a β-sulfatoethyl, β-chloroethyl or vinyl group.

* * * * *